(12) United States Patent
Naderializadeh et al.

(10) Patent No.: US 10,701,641 B2
(45) Date of Patent: Jun. 30, 2020

(54) INTERFERENCE MITIGATION IN ULTRA-DENSE WIRELESS NETWORKS

(71) Applicant: Apple Inc., Cupertino, CA (US)

(72) Inventors: Navid Naderializadeh, Santa Clara, CA (US); Hosein Nikopour, San Jose, CA (US); Shilpa Talwar, Cupertino, CA (US); Oner Orhan, San Jose, CA (US); Bahareh Sadeghi, Portland, OR (US); Carlos Cordeiro, Portland, OR (US); Hassnaa Moustafa, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/159,236

(22) Filed: Oct. 12, 2018

(65) Prior Publication Data
US 2019/0116560 A1 Apr. 18, 2019

Related U.S. Application Data

(60) Provisional application No. 62/572,330, filed on Oct. 13, 2017, provisional application No. 62/572,327, filed on Oct. 13, 2017.

(51) Int. Cl.
*H04W 52/24* (2009.01)
*H04W 52/28* (2009.01)
(Continued)

(52) U.S. Cl.
CPC .......... *H04W 52/243* (2013.01); *H04L 47/00* (2013.01); *H04W 24/02* (2013.01); *H04W 52/28* (2013.01); *H04W 52/281* (2013.01); *H04W 52/346* (2013.01); *H04W 72/082* (2013.01); *H04B 17/373* (2015.01); *H04W 52/245* (2013.01); *H04W 72/1247* (2013.01)

(58) Field of Classification Search
CPC .... H04B 7/024; H04B 7/0417; H04B 7/0452; H04B 7/0617; H04B 7/0639; H04L 5/0035; H04L 5/0037; H04L 25/03898; H04L 25/03987; H04L 5/0016; H04L 5/0048; H04L 5/00; H04L 5/0005; H04L 5/001; H04L 5/0058; H04L 5/0064; H04L 5/0073; H04W 72/121; H04W 72/1226; H04W 16/10; H04W 24/02; H04W 52/143; H04W 52/244; H04W 52/247; H04W 52/346; H04W 72/0473; H04W 72/08; H04W 72/082; H04W 72/1215; H04W 72/1273; H04W 72/1289; H04W 76/14; H04W 16/28; H04W 16/32; H04W 24/10
See application file for complete search history.

(56) References Cited

U.S. PATENT DOCUMENTS

| 2014/0051452 A1* | 2/2014 | Dotzler | H04L 5/0037 455/447 |
| 2014/0056282 A1* | 2/2014 | Sun | H04W 52/143 370/330 |

(Continued)

OTHER PUBLICATIONS

Naderializadeh, Navid, et al., "Ultra-Dense Networks in 5G: Interference Management via Non-Orthogonal Multiple Access and Treating Interference as Noise", (2017), 6 pgs.

*Primary Examiner* — Golam Sorowar
(74) *Attorney, Agent, or Firm* — Kowert, Hood, Munyon, Rankin & Goetzel, P.C.

(57) ABSTRACT

Aspects for interference mitigation in ultra-dense networks are described.

24 Claims, 15 Drawing Sheets

(51) Int. Cl.
    *H04W 24/02*     (2009.01)
    *H04W 72/08*     (2009.01)
    *H04W 52/34*     (2009.01)
    *H04L 12/70*     (2013.01)
    *H04W 72/12*     (2009.01)
    *H04B 17/373*    (2015.01)

(56) References Cited

U.S. PATENT DOCUMENTS

2014/0315593 A1* 10/2014 Vrzic .................... H04W 52/38
                                                           455/522
2015/0365887 A1* 12/2015 Tong .................... H04W 76/14
                                                           370/328
2016/0087694 A1*  3/2016 Vilaipornsawai ...... H04B 7/024
                                                           370/329

* cited by examiner

INTERFERENCE MITIGATION IN ULTRA-DENSE WIRELESS NETWORKS

PRIORITY CLAIM

This application claims the benefit of priority to U.S. Provisional Patent Application Ser. No. 62/572,327, filed Oct. 13, 2017, and titled "PARALLEL DYNAMIC CELL SELECTION AND LINK SCHEDULING FOR INTERFERENCE MANAGEMENT IN WIRELESS ULTRA-DENSE NETWORKS", and to U.S. Provisional Patent Application Ser. No. 62/572,330, filed Oct. 13, 2017, and titled "CHANNEL FEEDBACK FOR INTERFERENCE MANAGEMENT IN WIRELESS ULTRA-DENSE NETWORKS", both of which are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including new radio (NR) networks. Other aspects are directed to techniques, methods and apparatuses for interference mitigation in ultra-dense wireless networks and in networks in which vehicle-to-everything (V2X) communications are occurring.

BACKGROUND

In ultra-dense wireless networks, interference is caused by many wireless transmitters and receivers attempting to use the same wireless resources simultaneously. Current systems for interference mitigation are inflexible and increase in complexity as the size of the network grows, making them unsuitable for ultra-dense wireless networks.

BRIEF DESCRIPTION OF THE DRAWINGS

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1:
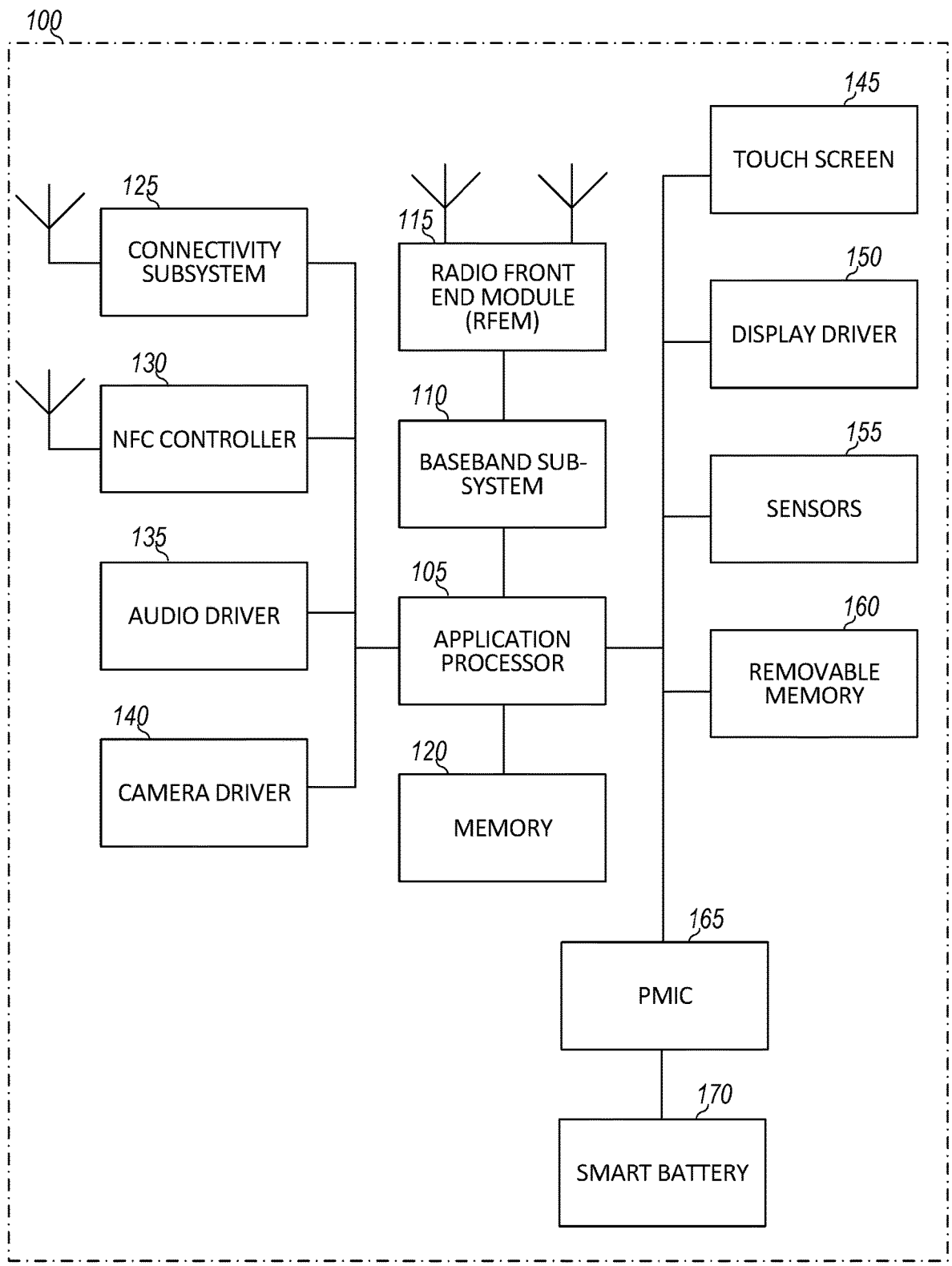
FIG. 1 illustrates an exemplary user device according to some aspects.

FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real time clock (RTC), timer-counters including interval and watchdog timers, general purpose IO, memory card controllers such as SD/MMC or similar, USB interfaces, MIPI interfaces, and/or Joint Test Access Group (JTAG) test access ports.

Figure 2:
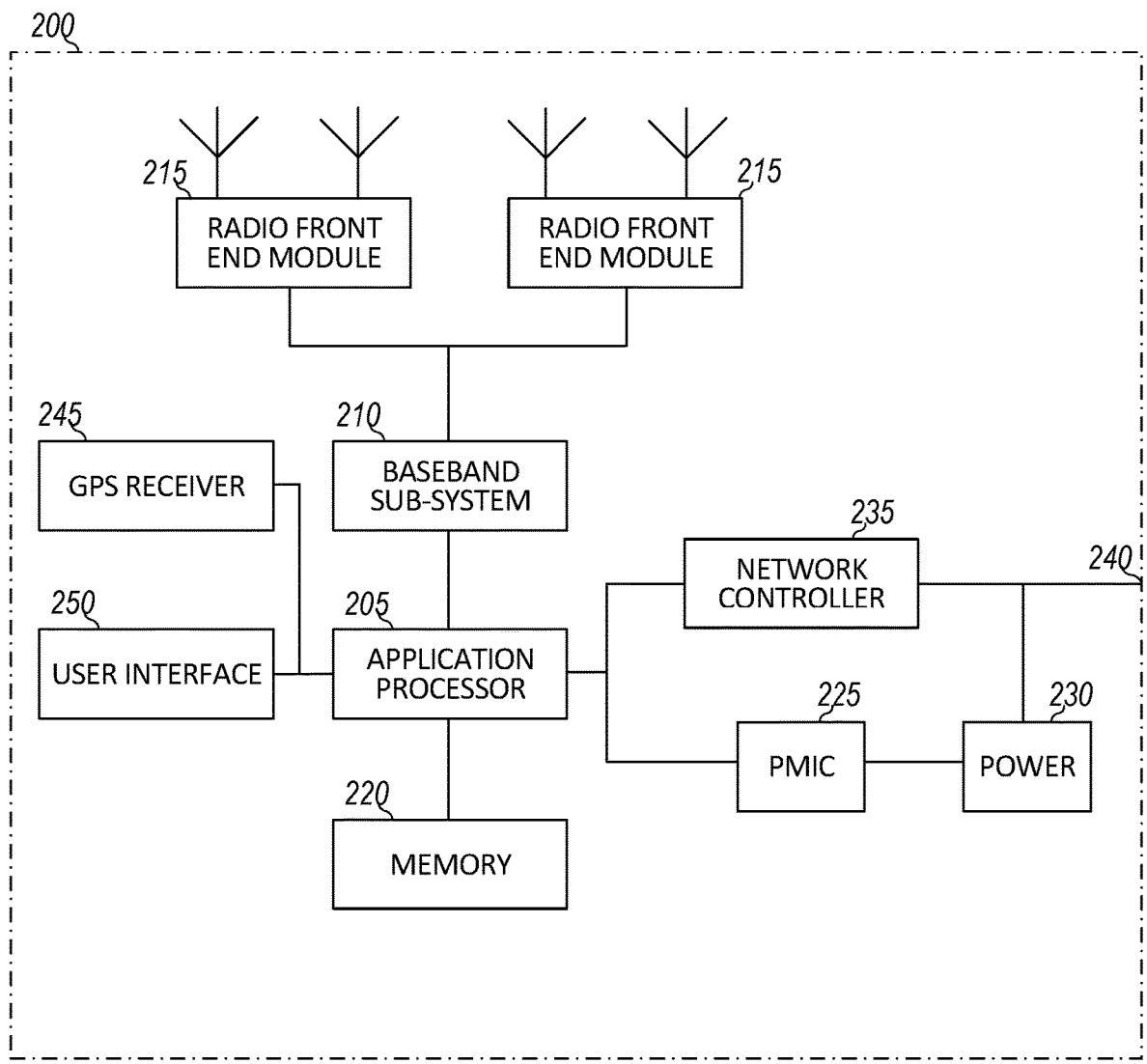
FIG. 2 illustrates an exemplary base station radio head according to some aspects.

In some aspects, baseband processor 110 may be implemented, for example, as a solder-down substrate including one or more integrated circuits, a single packaged integrated circuit soldered to a main circuit board, and/or a multi-chip module including two or more integrated circuits. The memory 120 can store FIG. 2 illustrates an exemplary base station or infrastructure equipment radio head according to some aspects. A base station may be termed, for example, a transmit point (TP), an Evolved Node-B (eNB, eNodeB), or a New Radio Node-B (gNB, gNodeB). The base station radio head 200, in some aspects, may be configured to implement or execute a centralized power control algorithm in order to mitigate interference as discussed in more detail below. In some aspects, the base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magneto-resistive random access memory (MRAM), and/or a three-dimensional cross point memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3:
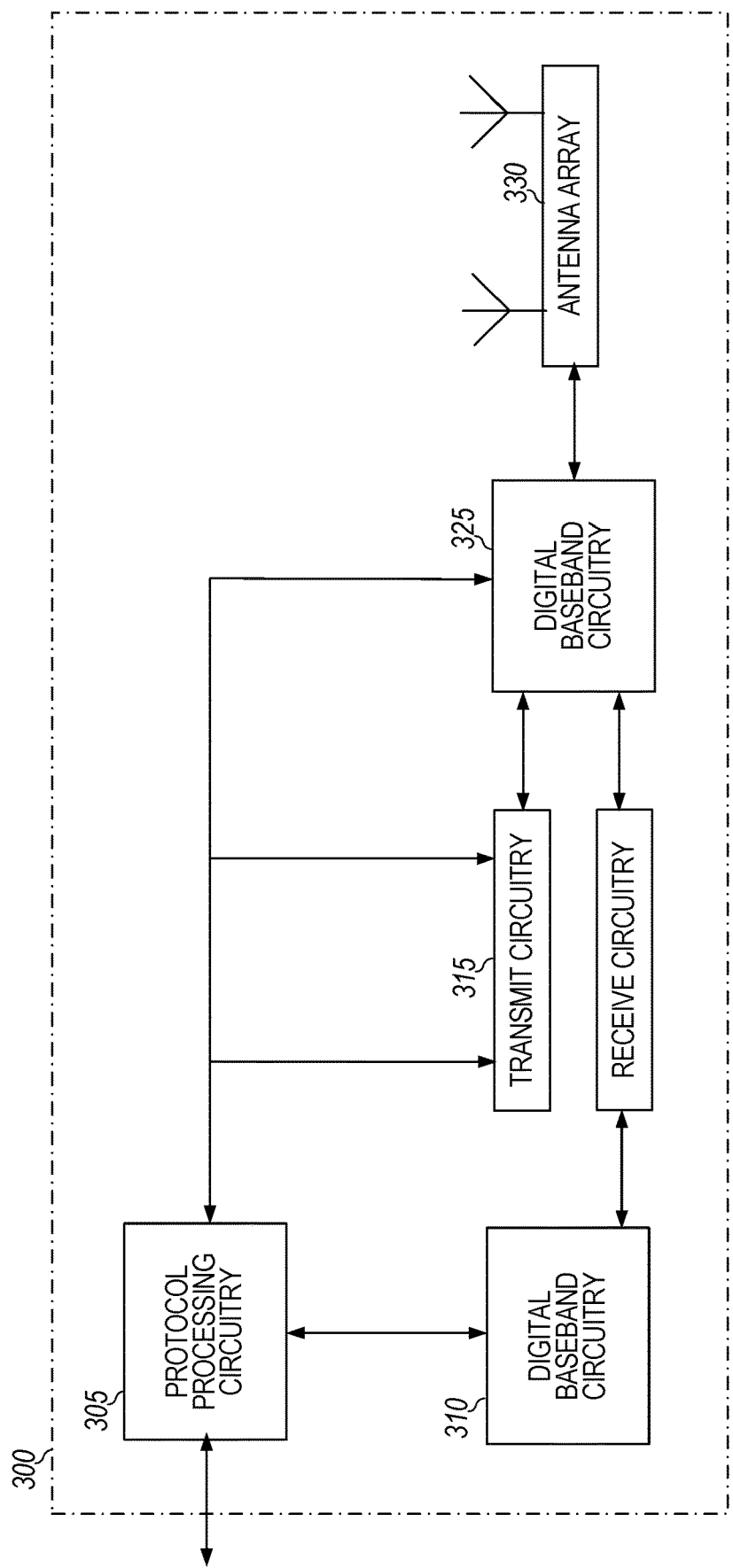
FIG. 3 illustrates exemplary communication circuitry according to some aspects.

FIG. 3 illustrates exemplary communication circuitry according to some aspects. Communication circuitry 300 shown in FIG. 3 may be alternatively grouped according to functions. Components illustrated in FIG. 3 are provided here for illustrative purposes and may include other components not shown in FIG. 3.

Communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, link adaptation, and other related functions.

Communication circuitry 300 may further include transmit circuitry 315, receive circuitry 320 and/or antenna array circuitry 330. Communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

Figure 4:
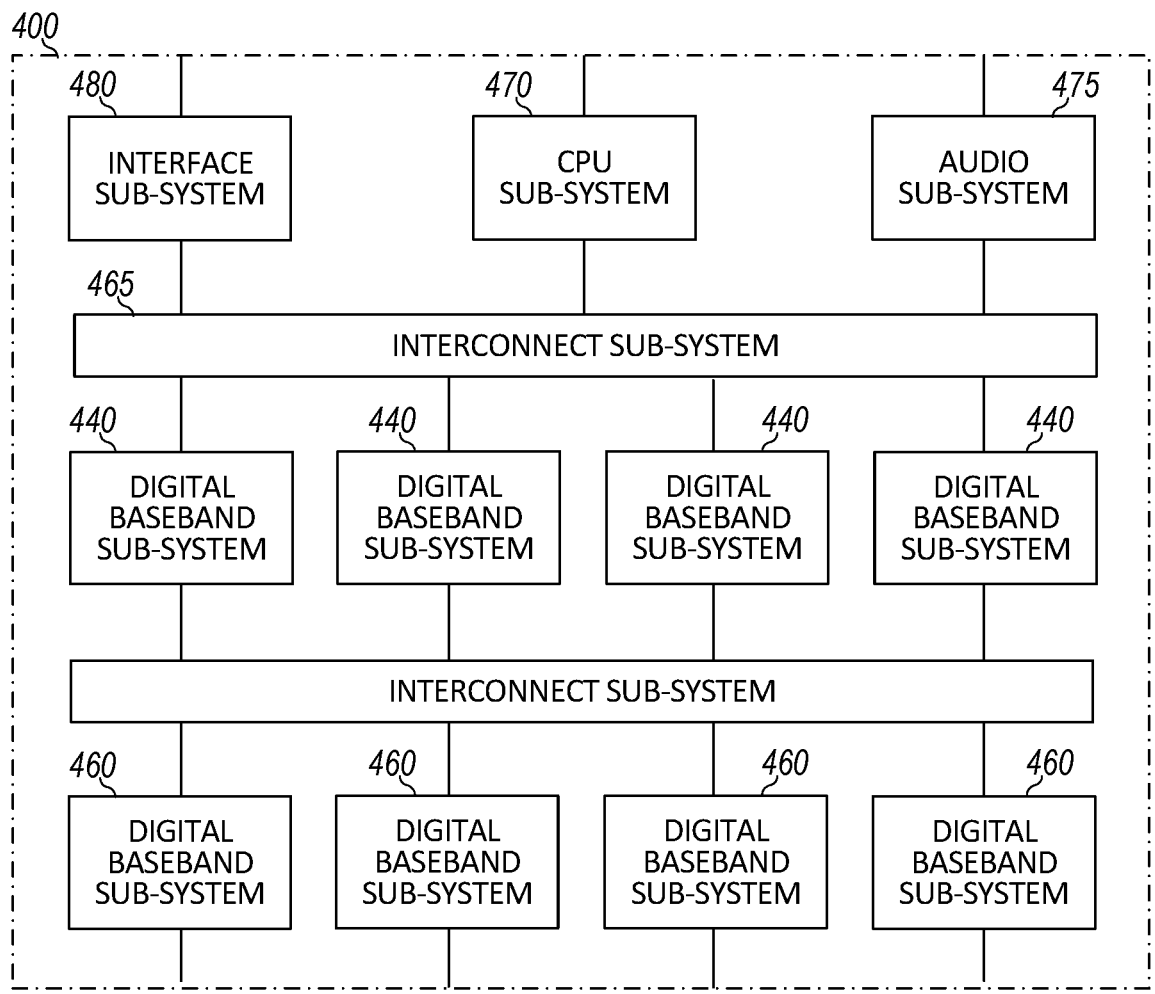
FIG. 4 illustrates an exemplary multi-protocol baseband processor useable in FIG. 1 or FIG. 2, according to some aspects.

FIG. 4 illustrates a multi-protocol baseband processor 400 useable in the system and circuitry shown in FIG. 1 or FIG. 2, according to some aspects. In an aspect, baseband processor may contain one or more digital baseband subsystems referred to collectively as digital baseband subsystems 440.

In an aspect, the one or more digital baseband subsystems 440 may be coupled via interconnect subsystem 465 to one or more of CPU subsystem 470, audio subsystem 475 and interface subsystem 480. In an aspect, the one or more digital baseband subsystems 440 may be coupled via interconnect subsystem 445 to one or more of each of digital baseband interface 460 and mixed-signal baseband subsystem 435.

In an aspect, interconnect subsystem 465 and 445 may each include one or more of each of buses point-to-point connections and network-on-chip (NOC) structures. In an aspect, audio subsystem 475 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, interconnect subsystem 465 and 445 may each include one or more of each of buses point-to-point connections and network-on-chip (NOC) structures.

Power Control Methods for Interference Mitigation

Figure 5:
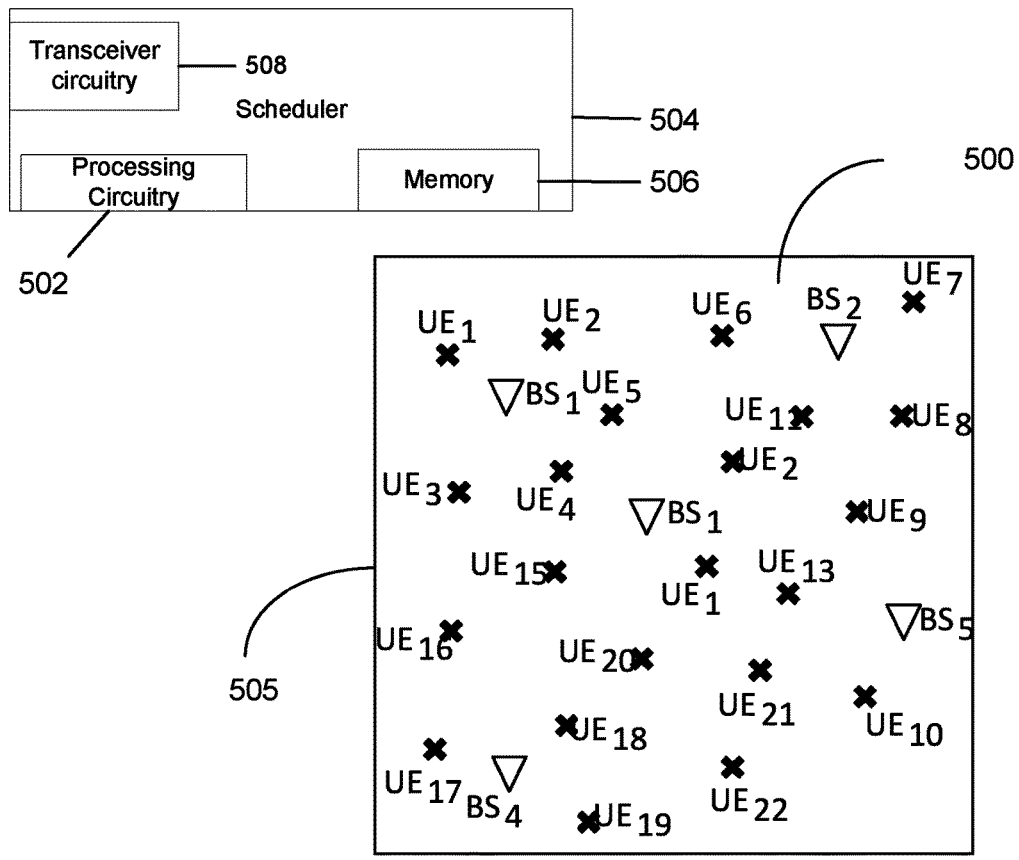
FIG. 5 illustrates a wireless network in which example aspects can be implemented.

FIG. 5 illustrates a wireless network 500 in which example aspects can be implemented. Without loss of generality, the wireless network 500 is shown to have a plurality of UEs and base stations (also referred to herein as transmit points (TPs). Previous power control methods for interference mitigation used binary power control to turn off TPs in the network in order to reduce the interference among the remaining TPs. The remaining TPs would transmit at full power to communicate downlink with scheduled UEs. This power control method is inflexible and becomes highly complex in large networks. Moreover, the performance gains can be limited when remaining TPs transmit at full power rather than accurately fine tuning power levels.

Centralized Greedy Method for Transmit Power Control

Methods, systems and apparatuses according to aspects provide centralized greedy transmit power control. In aspects, transmit power levels for TPs in the wireless network 500 are optimized in the descending order according to the priority of any UE/s associated with that respective TP. The UE priority might be defined for example based on proportional fairness (PF) ratio. Optimization may be performed, for example, in processing circuitry 502 of a scheduler 504, wherein the scheduler 504 is responsible for scheduling TPs and UEs within an area 505.

In aspects, the processing circuitry 502 can utilize a single-pass block coordinate ascent algorithm that optimizes the transmit power of the corresponding TP such that an overall network objective function (e.g., sum rate) is maximized. For example, if a TP is causing little interference, that TP may transmit with a higher power than another TP that is causing large amounts of interference.

Referring to FIG. 5, the wireless network 500 includes N TPs $\{TP_i\}_{i=1}^{N}$ and $$K \; UEs \{UE_j\}_{j=1}^{K},$$

located arbitrarily within an area. In the example illustrated in FIG. 5, N=5 TPs and K=22 UEs. However, it will be understood that methods implemented in accordance with some aspects can include more or fewer TPs and UEs than depicted in FIG. 5.

Methods according to some aspects are described with reference to a single-input single-output (SISO) flat fading channel. The SISO flat fading channel is equivalent to a post-processing channel of an orthogonal frequency division multiple access (OFDMA) tone. This equivalency implies that methods according to aspects can be applied to a frequency selective multiple-input multiple-output (MIMO) OFDMA system. In Equation 1, below, the channel gain between $TP_i$ and $UE_j$ at scheduling interval t is $g_{ji}h_{ji}(t)$, where $g_{ji}$ and $h_{ji}(t)$ respectively denote the long-term component of the channel gain (corresponding to path-loss and shadowing) and the short-term component of the channel gain (corresponding to short-term fading). It is further assumed that all transmissions occur in the same frequency band and interfere on each other. Therefore, at each scheduling interval t, assuming synchronous transmission of the TPs, the received signal of $UE_j$ is:

$$Y_j(t) = \sum_{i=1}^{N} g_{ji} h_{ji}(t) X_i(t) + Z_j(t) \quad (1)$$

where $X_i(t)$ denotes the transmit signal of $TP_i$ at scheduling interval t, subject to a maximum transmission power P, and $Z_j(t)$ denotes the additive white Gaussian noise at $UE_j$ in scheduling interval t, distributed as a complex Gaussian random variable with mean 0 and variance $\sigma^2$.

Processing circuitry 502 attempts to maximize a cost function (for example, weighted sum-rate) for an overall network 500 using a centralized power control algorithm described below. The power control algorithm described below can be utilized in conjunction with other interference management techniques. The power control performed according to aspects can be viewed as continuous power control, which in turn can be viewed as a generalization of binary (e.g., ON/OFF or 0/1) power control in which TPs are merely turned on or off to mitigate interference.

Initially, each UE gets associated with the TP to which, for example, each respective UE has the strongest long-term channel gain (lowest path-loss+shadowing). This association can be updated periodically, upon detection of a change in the wireless network 500, or at any other interval. Each transmit point $TP_i$ will maintain a list of the UEs associated with each respective $TP_i$.

The UE list of each TP is ordered according to a given priority criterion. One priority criterion is proportional fairness (PF). Suppose that $\bar{R}_j(t-1)$ denotes the long-term average rate of $UE_j$ at scheduling interval t−1 (to be defined later below). Then, at the start of the scheduling interval t, the PF ratio for each $UE_j$ is:

$$PF_j = \frac{\tilde{r}_j(t)}{\bar{R}_j(t-1)} \quad (2)$$

where $\tilde{r}_j(t)$ denotes the estimated instantaneous rate that $UE_j$ receives from $TP_{i_j}$ in the scheduling interval t. The PF ratio can be calculated by, for example, the baseband processor 210 (FIG. 2) of a TP. $\tilde{r}_j(t)$ be written as:

$$\tilde{r}_j(t) \approx \log_2\left(1 + \frac{P|\tilde{g}_{j i_j}(t)|^2}{\sum_{i \in T\{i_j\}} P\gamma_i(t)|\tilde{g}_{ji}(t)|^2 + \sum_{i \in S_T} P|\tilde{g}_{ji}(t)|^2 + \sigma^2}\right) \quad (3)$$

After calculating the PF ratios for the UEs, according to (2) the baseband processor 210 of each TP will perform UE scheduling by selecting the UE in its list with the highest priority (e.g. PF ratio) for communication. At each scheduling interval, after the UE scheduling phase is completed, the wireless network 500 includes N TPs that may communicate with N UEs. The set of TPs can be denoted by $\{TP_i\}_{i=1}^{N}$ and the set of scheduled UEs can be denoted by $\{UE_i\}_{i=1}^{N}$, where for each $i \in \{1, \ldots, N\}$, $TP_i$ intends to communicate to $UE_i$.

The processing circuitry 502 will then execute a power control algorithm by designating an order for the pairs. For example, the power control algorithm can sort the TP-UE pairs in descending order of PF ratio (or other fairness or priority criterion) for the corresponding UEs:

$$PF_1 \geq PF_2 \geq \ldots \geq PF_N \quad (4)$$

where for any $i \in \{1, \ldots, N\}$, $PF_i$ denotes the PF ratio of $UE_i$.

The scheduler 504 will further include memory 506 to store at least the TP-UE pairs. The scheduler 504 will provide messages to each TP instructing each TP to adjust transmission power to optimize the aggregate network weighted sum-rate (or any other relevant network metric or optimization function). In particular, the scheduler 504 provides a message over a control channel that instructs each $TP_i$ to adjust transmission power based on the following optimization problem:

$$P_i^* = \underset{P_i}{\operatorname{argmax}} \sum_{j=1}^{i-1} w_j \log\left(1 + \frac{P_j^* \tilde{g}_{jj}}{P_i \tilde{g}_{ji} + \sum_{\substack{k=1 \\ k \neq j}}^{i-1} P_k^* \tilde{g}_{jk} + \sum_{k=i+1}^{N} P \tilde{g}_{jk} + \sigma^2}\right) + \quad (5)$$

$$w_i \log\left(1 + \frac{P_i \tilde{g}_{ii}}{\sum_{j=1}^{i-1} P_j^* \tilde{g}_{ij} + \sum_{j=i+1}^{N} P \tilde{g}_{ij} + \sigma^2}\right) +$$

$$\sum_{j=i+1}^{N} w_j \log\left(1 + \frac{P \tilde{g}_{jj}}{P_i \tilde{g}_{ji} + \sum_{k=1}^{i-1} P_k^* \tilde{g}_{jk} + \sum_{\substack{k=i+1 \\ k \neq j}}^{N} P \tilde{g}_{jk} + \sigma^2}\right)$$

where for the TPs whose power levels have already been set ($\{TP_j\}_{j=1}^{i-1}$), the corresponding optimized power levels $$(\{P_j^*\}_{j=1}^{i-1})$$

are used in the objective function (e.g., sum rate), while for the TPs whose power levels have not yet been set, e.g., $$\{TP_j\}_{j=i+1}^{N},$$

the respective TP transmits at full transmission power P. Moreover, for each $UE_j$, $w_j$ denotes the weight of the user, which can be, for example, the inverse of the long-term average rate of the UE. The scheduler 504 may provide messages to TPs sequentially according to priority of a respective pair of the list of pairs.

$\tilde{g}_{ji}$ represents the estimate of the actual channel gain between $TP_i$ and UEj. It is assumed that the actual channel gain is based on measurements periodically reported back from the UEs to the TPs. It is further understood that the scheduler 504 includes transceiver circuitry 508 for communicating over the control channel.

For any $TP_i$, $i \in \{1, \ldots, N\}$, if $P^*_i \leq 0.1$ P, then set $P^*_i = 0$. Therefore, the minimum transmission power level for each TP is 10% of the full transmission power, otherwise the corresponding TP gets turned off (e.g., power for the corresponding TP is zero).

In some aspects, the power control algorithm described above with respect to Equations (1)-(5) can be executed by the processing circuitry 502 through several iterations on each TP until convergence.

Recently, there has been a surge of interest in non-orthogonal multiple access (NOMA) as a method for improving the performance of wireless networks. As compared to orthogonal multiple access (OMA), NOMA allows the superposition of signals of multiple receivers at a single transmitter, which can potentially lead to higher user data rates. User scheduling according to some aspects can be performed in wireless networks 500 that use NOMA.

In aspects, use of NOMA will affect the objective function as described below. For example, in each scheduling interval, each TP can select the UE in its UE list having the highest priority (e.g. PF ratio) for communication. Then, as the UE scheduling process continues according to aspects, each TP will search for a second UE in its UE list that, together with the first UE, maximizes the weighted sum-rate of the UEs if they are served by the TP using NOMA. In particular, without loss of generality, assuming $TP_1$ has selected $UE_1$ as its highest priority UE and is searching for a second UE in the remainder of its association list $L_1 \setminus \{1\}$. For any $UE_j$, $j \in L_1 \setminus \{1\}$, the weighted sum-rate can be written as $$f_j(\beta_j) = w_1 r_{1,NOMA}(\beta_j) + w_j r_{j,NOMA}(\beta_j) \quad (6)$$

where $\beta_j$ denotes the NOMA power allocation variable for $UE_j$, $r_{1,NOMA}(\beta_j)$ and $r_{j,NOMA}(\beta_j)$ respectively denote the rates of $UE_1$ and $UE_j$ under NOMA and $w_1$ and $w_j$ respectively denote the weights of $UE_1$ and $UE_j$. In accordance with the proportional fairness criterion, at each scheduling interval, the UE weights are assumed to be the inverse of their long-term average rates. In particular, for any $UE_j$:

$$w_j = \frac{1}{\bar{R}_j(t-1)} \quad (7)$$

To maximize the weighted NOMA sum-rate of each pair of UEs, apparatuses and methods according to aspects will optimize the corresponding NOMA power allocation variable. In performing this optimization, assume that in the current scheduling interval $UE_1$ has a better channel quality to $TP_1$ than $UE_j$, which can be expressed as $\tilde{g}_{11}(t) > \tilde{g}_{j1}(t)$. To serve both UEs, the baseband processor 210 of $TP_1$ will do superposition coding, allocating a fraction $0 \leq \beta_j \leq 1$ of its power to $UE_j$ (e.g., the "weak" UE) and the remaining $1-\beta_j$ fraction of its power to $UE_1$ (e.g., the "strong" UE). In this way, the strong UE uses successive interference cancellation (SIC) to decode its message. In aspects, the strong UE first decodes the message of the weak UE, temporarily treating its own message as noise, then subtracts its contribution from its received signal to cancel its interference and finally decodes its own signal. The weak UE decodes its message by treating the interference due to the strong UE's message as noise.

Using the aforementioned encoding and decoding, the rates of each of the UEs can be written as $$r_{1,NOMA}(\beta_j) = \log_2\left(1 + \frac{P(1-\beta_j)|\tilde{g}_{11}(t)|^2}{\sum_{i=2}^{N} P\gamma_i(t-1)|\tilde{g}_{1i}(t)|^2 + \sigma^2}\right) \quad (8)$$

$$r_{j,NOMA}(\beta_j) = \quad (9)$$

$$\min\left\{\begin{array}{l} \log_2\left(1 + \frac{P\beta_j|\tilde{g}_{11}(t)|^2}{\sum_{i=2}^{N} P\gamma_i(t-1)|\tilde{g}_{1i}(t)|^2 + P(1-\beta_j)|\tilde{g}_{11}(t)|^2 + \sigma^2}\right), \\ \log_2\left(1 + \frac{P\beta_j|\tilde{g}_{j1}(t)|^2}{\sum_{i=2}^{N} P\gamma_i(t-1)|\tilde{g}_{ji}(t)|^2 + P(1-\beta_j)|\tilde{g}_{j1}(t)|^2 + \sigma^2}\right) \end{array}\right\}$$

where in Equation (8), the first term in the minimum corresponds to the rate of decoding the weak $UE_j$'s message at $UE_1$ and the second term corresponds to the rate of decoding the weak $UE_j$'s message at $UE_j$. Assuming that the latter rate is the smaller of the two, $r_{j,NOMA}(\beta_j)$ can be simplified to:

$$r_{j,NOMA}(\beta_j) = \log_2\left(1 + \frac{P\beta_j|\tilde{g}_{j_1}(t)|^2}{\sum_{i=2}^{N} P\gamma_i(t-1)|\tilde{g}_{ji}(t)|^2 + P(1-\beta_j)|\tilde{g}_{j_1}(t)|^2 + \sigma^2}\right) \quad (10)$$

The weighted sum-rate for the above two UEs can be written as:

$$f_j(\beta_j) = w_1 \log_2\left(1 + \frac{P(1-\beta_j)|\tilde{g}_{11}(t)|^2}{\sum_{i=2}^{N} P\gamma_i(t-1)|\tilde{g}_{1i}(t)|^2 + \sigma^2}\right) + \\ w_j \log_2\left(1 + \frac{P\beta_j|\tilde{g}_{j_1}(t)|^2}{\sum_{i=2}^{N} P\gamma_i(t-1)|\tilde{g}_{ji}(t)|^2 + P(1-\beta_j)|\tilde{g}_{j_1}(t)|^2 + \sigma^2}\right) \quad (11)$$

It can be shown that the above weighted sum-rate is maximized at:

$$\beta_j^* = 1 - \frac{w_1|\tilde{g}_{11}(t)|^2\left(\sum_{i=2}^{N} P\gamma_i(t-1)|\tilde{g}_{ji}(t)|^2 + \sigma^2\right) - w_j|\tilde{g}_{j_1}(t)|^2\left(\sum_{i=2}^{N} P\gamma_i(t-1)|\tilde{g}_{1i}(t)|^2 + \sigma^2\right)}{|\tilde{g}_{11}(t)|^2|\tilde{g}_{j_1}(t)|^2 P(w_j - w_1)} \quad (12)$$

It is determined whether $\beta^*_j$ is feasible by checking whether $\beta^*_j$ is within the interval [0.5,1]. If so, set $f^*_j = f_j(\beta^*_j)$. Otherwise, set $f^*_j = 0$, indicating that $UE_j$ cannot be served by NOMA together with $UE_1$.

After the above calculations, $TP_1$ will check whether it achieves a higher weighted sum-rate if it operates in NOMA mode compared to the single-user mode, only serving $UE_1$; i.e., it checks whether $$\max_{j \in L_1 \setminus \{1\}} f^*_j > PF_1$$

If the above condition is satisfied, let $UE_{j^*}$ be the UE which yields the highest weighted NOMA sum-rate together with $UE_1$:

$$j^* = \arg\max_{j \in L_1 \setminus \{1\}} f^*_j \quad (13)$$

Then both $UE_1$ and $UE_{j^*}$ are scheduled to be served by $TP_1$ in NOMA mode. Otherwise, only $UE_1$ is scheduled to be served by $TP_1$ in single-user mode.

When user scheduling involves NOMA, a similar power control algorithm may be applied with some minor differences. TPs are prioritized based on, for example, the weighted sum-rate of their scheduled UE(s), whether they are in single-user mode or in NOMA mode. Moreover, the rates of both strong and weak UEs shall be included in the objective function for the TPs that are operating in NOMA mode.

Parallel Dynamic Cell Selection and Power Control

Methods and apparatuses according to some aspects provide dynamic cell selection in conjunction and in parallel with power control to reduce or eliminate interference in the network 500. A UE may be paired with a best-available TP, and the pairing can be dynamically changed as interference conditions and other conditions in the network 500 change.

According to some aspects, each UE can adjust its associated TP if the strongest-available TP is not available. For example, a strongest TP may already be serving other UEs and unable to serve one particular UE or any additional UEs. In some aspects, the UE having highest priority is assigned to a TP from which it is receiving the strongest signal, and the TP-UE pair is scheduled, by a central scheduler 504, for transmission at an adjusted power.

Figure 6A:
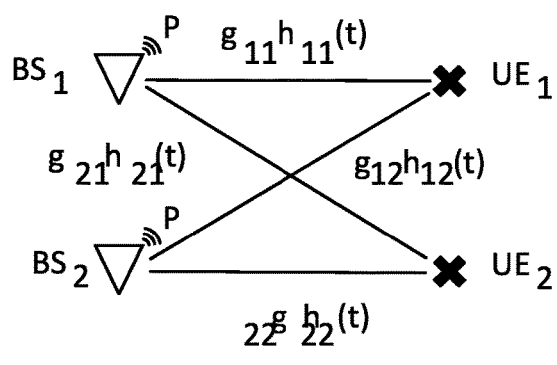
FIG. 6A illustrates a first phase of signaling and feedback for channel measurement according to some aspects.
Figure 6B:
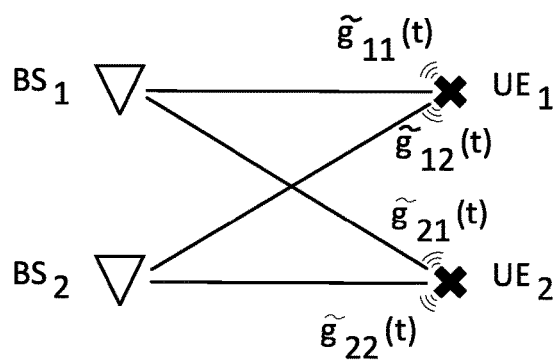
FIG. 6B illustrates a second phase of signaling and feedback for channel measurement according to some aspects.

FIG. 6A illustrates signaling and feedback for channel measurement in a network having two TPs (or base stations (BSs)) and two UEs according to some aspects. FIG. 6A illustrates signaling and feedback for channel measurement in a network having two TPs (or base stations (BSs)) and two UEs according to some aspects. As illustrated, each of $UE_1$ and $UE_2$ measure gain between each of $TP_1$ and $TP_2$. Methods according to aspects rely on UEs frequently or periodically measuring and reporting the channel state information between the neighboring TPs and the UEs. As an example, for a given measurement period T, at each scheduling interval $t = nT$, each $UE_j$ reports $$\tilde{g}_{ji}(nT) = \sqrt{\frac{1}{nT} g_{ji}^2 \sum_{i=1}^{nT} |h_{ji}(t)|^2}$$

back to $TP_i$, where $\tilde{g}_{ji}(t)$ represents the approximate measurement of the actual channel gain between $TP_i$ and $UE_j$. For $t \neq nT$, $$\tilde{g}_{ji}(t) = \tilde{g}_{ji}\left(\left\lfloor \frac{t}{T} \right\rfloor T\right).$$

The UE can perform measurements via pilot signals that the TPs send over distinct tones.

Figure 7:
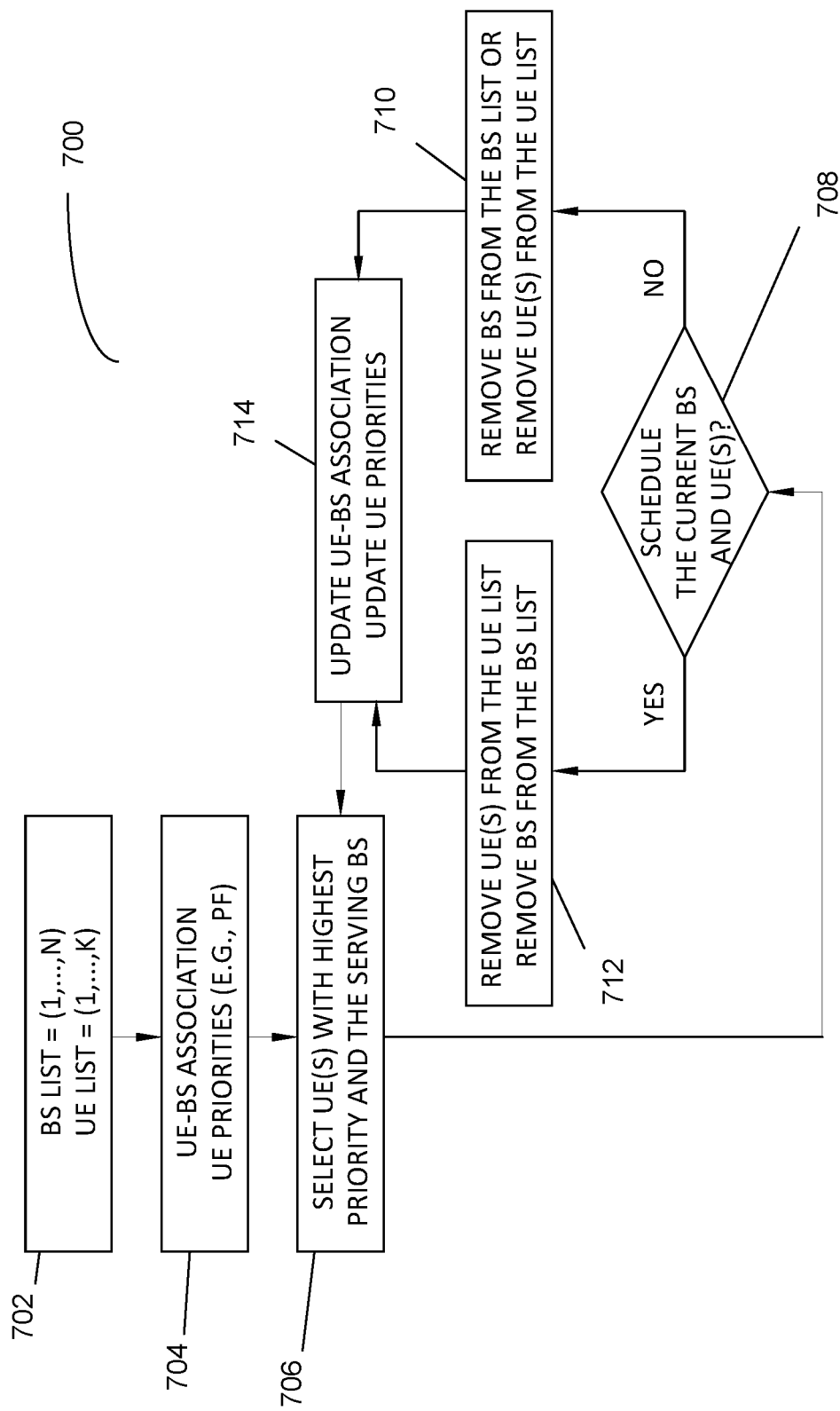
FIG. 7 illustrates an algorithm for dynamic cell selection according to some aspects.

At each scheduling interval, the central scheduler 504 implements a scheduling algorithm 700 as illustrated in FIG. 7 having at most min{N, K} iterations, where N is the number of TPs and K is the number of UEs in the area 505. In each iteration, a single UE or a pair of UEs are considered as candidate(s) to be served by a potential TP. The central scheduler 504 will schedule that potential TP to serve the candidate UE/s if the UE/s is/are not receiving significant interference from the TPs that were scheduled in previous iterations of the scheduling algorithm 700 and if the potential TP is not significantly interfering with UE/s that have already been scheduled. If the UE/s and TP are scheduled, the UE/s and TP are removed from the set of available UEs and TPs. The amount of interference needed here to prevent scheduling can be set by an operator to a predetermined threshold, or can be set according to a standard, although aspects are not limited thereto. The central scheduler 504 continues with further iterations of the scheduling algorithm 700 until there are no more UEs or TPs available to be scheduled.

The scheduling algorithm 700 begins with operation 702 with the central scheduler 504 initializing the set of T (available TPs) and U (available UEs to include all TPs and UEs:

$$T=\{1,2,\ldots,N\} \quad (14)$$

$$U=\{1,2,\ldots,K\} \quad (15)$$

Moreover, let $S_T$ and $S_U$, respectively, denote the set of TPs and UEs that have been already scheduled. These should be initially set to the null set.

The central scheduler 504 then continues with operation 704 by associating each available UE of the list of available UEs with the available TP based on a value representative of signal strength between each UE and the respective TP. For example, the respective UE may be associated to the TP with which the UE has the strongest long-term channel gain. In particular, $UE_j$, $j \in U$ gets associated with $TP_{i_j}$ where $$i_j = \underset{i \in T}{\arg\max} |g_{ji}| \quad (16)$$

The central scheduler 504 orders the UEs according to a given priority criterion, for example PF as described earlier herein with respect to Equation (2).

After calculating the PF ratios for the available UEs, the central scheduler 504 continues with operation 706 by selecting the available UE with the highest PF ratio, denoted by $UE_{j*}$ and its serving $TP_{i_{j*}}$. The TP may operate in single-user mode, only serving $UE_{j*}$, or operate in NOMA mode and serve another UE alongside $UE_{j*}$. In the NOMA case, the TP can perform UE scheduling as described earlier herein to select a potential secondary $UE_{j'*}$ in the TP's association list, which helps increase the weighted sum-rate compared to the single-user PF ratio.

Upon determination of the currently selected $TP_{i_{j*}}$ and the single UE or the pair of UEs that $TP_{i_{j*}}$ intends to serve, the central scheduler 504 implements a link scheduler portion in operation 708 to determine whether the selected TP should be activated and begin serving the selected UE(s). In some aspects, the central scheduler 504 will schedule according to a full-reuse method, in which the selected TP and UE(s) will always be scheduled. In other aspects, the central scheduler 504 determines whether the selected TP is causing strong or weak interference at UEs in $S_U$ that are already scheduled, and also whether the selected UE/s is/are receiving strong/weak interference from the TPs in $S_T$ that are already scheduled.

Upon checking the above-described conditions, there are three possible cases. In the case of strong outgoing interference, the TP will not be scheduled to serve the selected UE(s) and the selected TP will be removed from the available TP list according to $T \leftarrow T \setminus \{i_{j*}\}$ in operation 710. In the case of strong incoming interference, the TP will not be scheduled to serve the selected UE(s) and the selected UE(s) will be removed from the available UE list also in operation 710. Therefore, in single-user mode: $U \leftarrow U \setminus \{j*\}$, and in NOMA mode: $U \leftarrow U \setminus \{j*, j'*\}$.

In the case of weak incoming and outgoing interference, the TP will be scheduled to serve the selected UE(s) and both TP and UE/s will be removed from the list in operation 712. In operation 714, the central scheduler 504 therefore updates the set of scheduled and available TPs according to $S_T \leftarrow S_T \cup \{i_{j*}\}$ and $T \leftarrow T \setminus \{i_{j*}\}$. In single-user mode, the set of scheduled and available UEs is updated: $S_U \leftarrow S_U \cup \{j*\}$ and $U \leftarrow U \setminus \{j*\}$. In NOMA mode, the sets should be updated: $S_U \leftarrow S_U \cup \{j*, j'*\}$ and $U \leftarrow U \setminus \{j*, j'*\}$.

After operation 714, the central scheduler 504 continues with further iterations at operation 706. Operations 706, 708, 710, 712, and 714 are iteratively implemented where appropriate until no available UEs and TPs remain.

The central scheduler 504 can implement transmission power control in conjunction with scheduling, either after scheduling has been performed or concurrently with scheduling.

Figure 8:
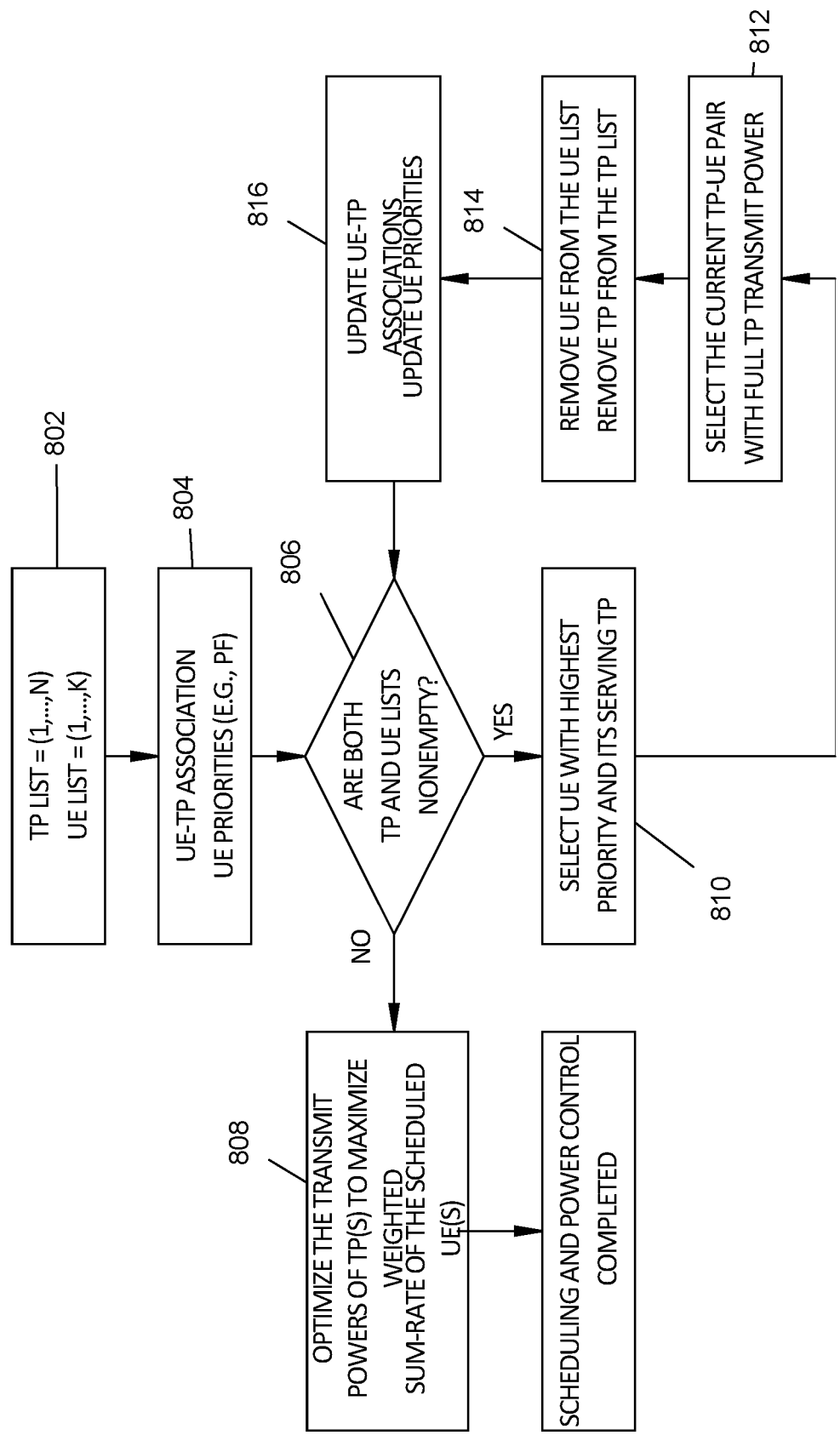
FIG. 8 illustrates a method for transmission power control performed by the central scheduler after scheduling according to some aspects.

FIG. 8 illustrates a method 800 for transmission power control performed by the central scheduler 504 after scheduling according to some aspects. The method 800 begins with operation 802 with the central scheduler 504 initializing the set of T (available TPs) and U (available UEs to include all TPs and UEs, similarly to operation 702 and Equations (14) and (15) discussed earlier herein.

The central scheduler 504 then continues with operation 804 by associating each available UE of the list of available UEs with the available TP to which, for example, the respective UE has the strongest long-term channel gain, similarly to operation 704 and Equation (16) discussed above. The central scheduler 504 orders the UEs according to a given priority criterion, for example PF as described earlier herein with respect to Equation (2).

After calculating the PF ratios for the available UEs, the central scheduler 504 determines whether there are available UEs and TPs at operation 806. If there are no more available UEs and TPs, the central scheduler 504 implements power control methods at operation 808 as described above with reference to at least Equation (5). Else, the central scheduler 504 continues with operation 810 by selecting the available UE with the highest PF ratio, denoted by $UE_{j*}$ and its serving $TP_{i_{j*}}$. At operation 812, the central scheduler 504 schedules the current UE/TP pair with the TP to operate at full power. In operation 814, the scheduled UEs and TPs are removed from lists similarly to operation 710 (FIG. 7) and priorities and associations are updated similarly to operation 714 (FIG. 7).

In aspects in which power control is performed concurrently with scheduling, operation 808 will be omitted and those functionalities will be performed with operation 812.

Feedback-Based Methods for Interference Management

Methods and apparatuses according to some aspects utilize periodic feedback of the channel quality indicator (CQI) measured at the UEs, while minimizing the feedback overhead in terms of number of channel metrics reported per UE. Such feedback reports can help enable the interference management schemes described earlier herein. Overhead can be minimized by taking advantage of the network topology to maximize the packing of the activated links at each time instant.

In order for the TPs to have a knowledge of the channel gains, which were defined and discussed above with reference to FIG. 5 and Equation (1), the UEs will periodically send feedback information about their local channel gains to the TPs according to some aspects. In some aspects, each UE measures the received signal power from one or more nearby dominant TPs. In some aspects, each UE will also measure the residual interference caused by the remaining non-dominant TPs within the area 505. The measurements can be done, for example, via orthogonal pilot symbols.

In aspects, each UE can estimate the signal-to-interference-plus-noise ratio (SINR) due to the dominant TPs, while with respect to non-dominant TPs only interference is taken into account. Each UE will provide feedback on the measured SINR from the dominant TPs to the central scheduler 504. Based on the received CQI feedback, the TPs decide which UEs to serve, and thereafter perform UE scheduling for those UEs. TPs are also activated or deactivated according to procedures described earlier herein based on the feedback. The measuring and reporting can be done for wideband scheduling schemes as well as sub-band-level scheduling schemes.

Each UE will only feedback the CQI corresponding to a select few nearby TPs, referred to as the UE report set. The information-theoretic link scheduling (ITLinQ) criterion is used to decide which TPs constitute the UE report set in some example aspects, although aspects are not limited thereto. In particular, suppose that for each $UE_j$, $j \in \{1, \ldots, K\}$, the UE or central scheduler 504 can identify the TP from which the strongest reference signal received power (RSRP) is received, and denote this TP by $TP_{i_j}$. In particular, if the RSRP of $TP_i$ at $UE_j$ is denoted by $RSRP_{ji}$, then:

$$i_j = \arg\max_{i \in \{1, \ldots, N\}} |RSRP_{ji}| \quad (17)$$

After identifying the strongest TP for $UE_j$, any $TP_i$ will be in the report set of $UE_j$, denoted by $C_j$, if and only if $$\frac{RSRP_{ji}}{\sigma^2} \geq \left(\frac{RSRP_{ji_j}}{\sigma^2}\right)^{\eta_{CQI}} \quad (18)$$

for some $\eta_{CQI} \in [0,1]$ that can be tuned to change the average report set size throughout the network. The above criterion, which is based on the ITLinQ scheduling criterion, states that the signal power due to $TP_i$ at $UE_j$ is "strong enough" to be included in the report set. In some aspects, this parameter can be tuned such that the average size of the report sets of the UEs is around 4.

For each UE, the TPs outside the UE's report set are viewed as all contributing toward an aggregate residual interference plus noise. In particular, for $UE_j$, the residual interference at scheduling interval t can be written as:

$$\delta I_j(t) = \Sigma_{i \in \{1, \ldots, N\} \setminus C_j} P\gamma_i(t)|h_{ji}(t)|^2 + \sigma^2 \quad (19)$$

where $\gamma_i(t) \in \{0,1\}$ denotes the indicator variable representing whether or not $TP_i$ is active in scheduling interval t. It can be assumed that for each UE, the UE, central scheduler 504 or other element have access to an estimate of the residual interference only based on the RSRPs. In particular, the following information is assumed to always be accessible for each UE:

$$\Delta I_j = \Sigma_{i \in \{1, \ldots, N\} \setminus C_j} RSRP_{ji} + \sigma^2 \quad (20)$$

Moreover, at each scheduling interval, each $UE_j$ can obtain a long-term average estimate of its received residual interference using, for example, the following recursive equation $$\delta \bar{I}_j(t) = \alpha_{CSI} \delta \bar{I}_j(t-1) + (1-\alpha_{CSI}) \delta I_j(t) \quad (21)$$

where $$\alpha_{CSI} = 1 - \frac{1}{T_{FB}}$$

is a constant determining the forget factor of the long-term residual interference, which depends on the CQI feedback period $T_{FB}$.

As mentioned above, CQI feedback period is denoted by $T_{FB}$. In aspects, there may also be a feedback delay denoted by $\Delta_{FB}$. These two quantities will specify the frequency of the feedback reports and their delay in terms of the number of scheduling intervals.

For each $n=1, 2, \ldots$, each $UE_j$ can report the following CQI feedback reports to the central schedule r504:

$$g_{ji}(nT_{FB} + \Delta_{FB}) = \frac{P|h_{ji}(nT_{FB})|^2}{\delta \bar{I}_j(nT_{FB})}, i \in C_j \quad (22)$$

This implies that at each scheduling interval whose index is a multiple of the feedback period $T_{FB}$, the UE measures the received powers from the TPs in its report set and calculates the SINR due to each of those TPs considering the long-term residual interference at that scheduling interval. Due to the processing delays at the transmitters and receivers, the UE then reports such SINR information back to the central scheduler 504 after a delay of $\Delta_{FB}$ scheduling intervals.

Aside from the above CQI feedback reports from the UEs, due to the centralized scheduling process, we assume that for all the TPs in the network, we have access to an estimate of the probability that the TP is going to be scheduled in each scheduling interval. In particular, for each $TP_i$, we denote this probability as $\bar{\gamma}_i(t)$ and estimate it as $$\bar{\gamma}_i(t) = \frac{1}{t-1} \sum_{t'=1}^{t-1} \gamma_i(t') = \frac{(t-2)\bar{\gamma}_i(t-1) + \gamma_i(t-1)}{t-1} \quad (23)$$

This equation implies that the scheduling probability of each TP is estimated as the average fraction of the scheduling intervals that the TP has been scheduled so far.

Having access to the above CQI information, especially the feedback reports from the UEs, interference management as described earlier herein can be implemented at the central scheduler 504, for example, although aspects are not limited thereto. For example, rate and PF ratio estimation can be performed using feedback reports and CQI information. As described with reference to Equation (2), the instantaneous rate for each UE is used to estimate the PF ratio for the UE, and the PF ratio in turn is used to associate UEs to the TPs according to UE scheduling algorithms. PF ratio is used also for priority assignments according to ITLinQ schemes.

Figure 9:
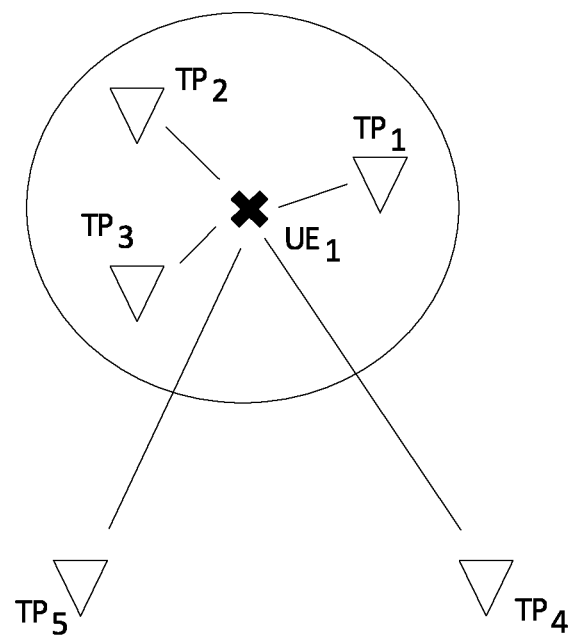
FIG. 9 illustrates rate and proportional-fairness ratio estimation according to some aspects.

FIG. 9 illustrates rate and proportional-fairness ratio estimation according to some aspects. Suppose that $UE_1$ has three TPs (TP1, TP2, and TP3) in its report set $C_1 = \{1,2,3\}$ and TP4 and TP5 only contribute to the residual interference at this UE. To estimate the instantaneous rate that the UE is receiving from $TP_1$ at scheduling interval t, Equation (3) is solved according to the below:

$$\tilde{r}_{11}(t) = \log_2\left(1 + \frac{P|h_{11}(t)|^2}{\delta \bar{I}_1(t) + \sum_{i \in C_1 \setminus \{1\}} P\gamma_i(t)|h_{1i}(t)|^2}\right) \quad (24)$$

$$= \log_2\left(1 + \frac{\frac{P|h_{11}(t)|^2}{\delta \bar{I}_1(t)}}{1 + \sum_{i=2}^{3} \gamma_i(t) \frac{P|h_{1i}(t)|^2}{\delta \bar{I}_1(t)}}\right) \quad (25)$$

$$\approx \log_2\left(1 + \frac{g_{11}(t)}{1 + \sum_{i=2}^{3} \overline{\gamma}_i(t)g_{1i}(t)}\right) \quad (26)$$

where in (26) the approximation $$g_{1i}(t) \approx \frac{P|h_{1i}(t)|^2}{\delta I_1(t)}$$

was used and for notational simplicity, if $t \neq nT_{FB} + \Delta_{FB}$ for any n, we let $g_{ji}(t) := g_{ji}(nT_{FB} + \Delta_{FB})$ where n=max m such that $mT_{FB} + \Delta_{FB} \leq t$ which represents the most recent CQI feedback for the link between $TP_i$ and $UE_j$.

Moreover, because it cannot be known a priori whether the interfering TPs in the dominant set (e.g., TP2 and TP3 in the above example) are going to be scheduled in the current scheduling interval, interference power for those TPs is scaled by a factor that is the probability of those TPs being scheduled in the current scheduling interval.

As described earlier herein NOMA can be used to serve more UEs at the same time, enhancing both the system throughput and network coverage. CQI feedback reports can be used in NOMA implementations to estimate the power allocation variables for a TP that is serving two users via NOMA.

Figure 10:
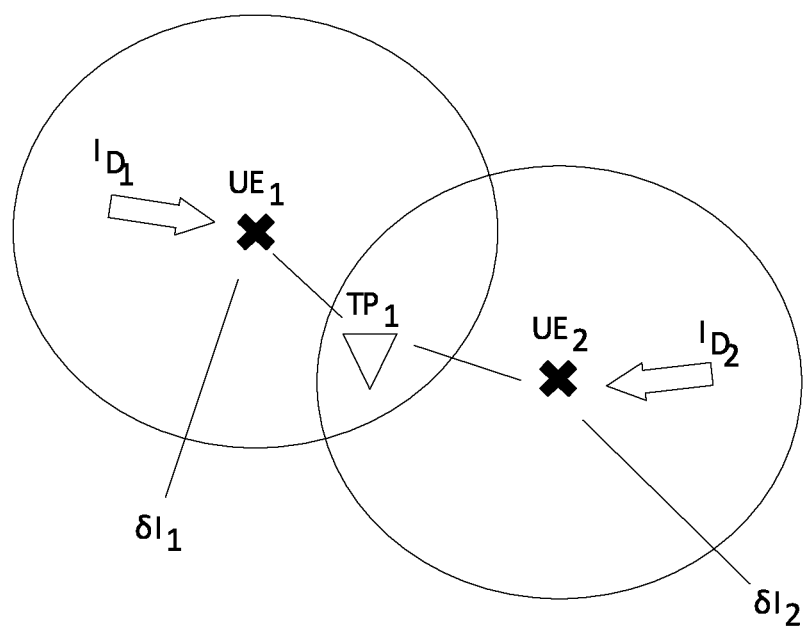
FIG. 10 illustrates non-orthogonal multiple access power allocation using CQI feedback reports according to some aspects.

FIG. 10 illustrates NOMA power allocation using CQI feedback reports according to some aspects. Referring to FIG. 10, suppose $TP_1$ intends to serve $UE_1$ and $UE_2$ via NOMA. As a shorthand notation, let $I_{D_j}$ denote the total interference to $UE_j$ stemming from the interfering TPs in the $UE_j$ report set. If the weight of each $UE_j$ is denoted by $w_j$, then the NOMA power allocation variable (discussed with reference to Equation (6)) can be written as:

$$\beta^* = 1 - \frac{w_2|h_{21}|^2(I_{D_1} + \delta I_1) - w_1|h_{11}|^2(I_{D_2} + \delta I_2)}{P|h_{11}|^2|h_{21}|^2(w_1 - w_2)} \quad (27)$$

$$= 1 - \frac{w_2\frac{P|h_{11}|^2}{\delta I_2}\left(1 + \frac{I_{D_1}}{\delta I_1}\right) - w_1\frac{P|h_{11}|^2}{\delta I_1}\left(1 + \frac{I_{D_2}}{\delta I_2}\right)}{(w_1 - w_2)\left(\frac{P|h_{11}|^2}{\delta I_1}\right)\left(\frac{P|h_{21}|^2}{\delta I_2}\right)} \quad (28)$$

$$\approx 1 - \frac{w_2 g_{21}\left(1 + \sum_{i \in C_1 \setminus \{1\}} \overline{\gamma}_i g_{1i}\right) - w_1 g_{11}\left(1 + \sum_{i \in C_2 \setminus \{1\}} \overline{\gamma}_i g_{2i}\right)}{(w_1 - w_2) g_{11} g_{21}} \quad (29)$$

Figure 11:
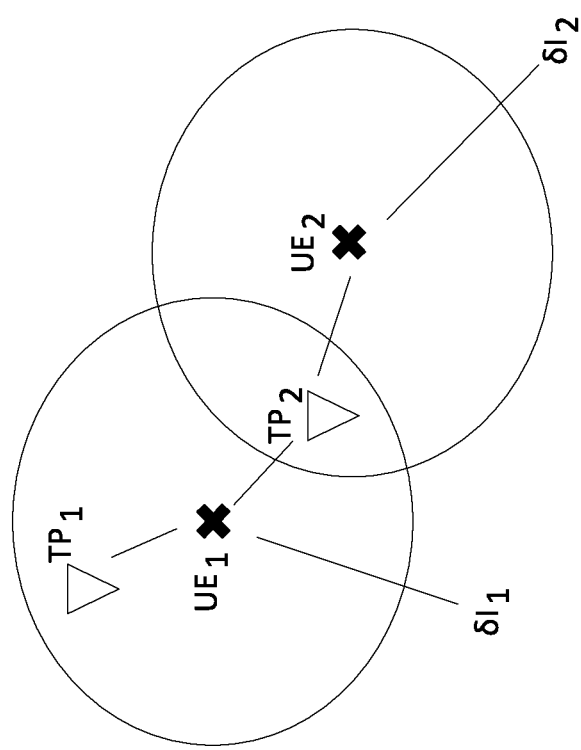
FIG. 11 demonstrates how checking the ITLinQ scheduling conditions can be done using CQI feedback reports according to some aspects.

As described earlier herein, interference management schemes can identify a subset of links throughout the network 500 that can be activated together with a minimal level of interference on each other, while the rest of the links are deactivated. For example, an ITLinQ scheme can be used to decide which links can be turned on in the network. FIG. 11 demonstrates how checking the ITLinQ scheduling conditions can be done using CQI feedback reports according to some aspects.

Referring to FIG. 11, suppose $TP_1$ is scheduled to serve $UE_1$ and the central scheduler 504 or other apparatus is to decide whether $TP_2$ should also be activated to serve $UE_2$. Based on the ITLinQ criterion, $TP_2$ should be activated if, for example, $INR_{12} \leq M \cdot SNR_2^\eta$, which indicates that TP2 is not causing strong interference at higher-priority UEs that are already scheduled. This inequality can make use of CQI feedback reports by re-writing as below:

$$\leftrightarrow \frac{P|h_{12}|^2}{\sigma^2} \leq M\left(\frac{P|h_{22}|^2}{\sigma^2}\right)^\eta$$

$$\leftrightarrow \frac{P|h_{12}|^2}{\delta I_1} \cdot \frac{\delta I_1}{\sigma^2} \leq M\left(\frac{P|h_{22}|^2}{\delta I_2} \cdot \frac{\delta I_2}{\sigma^2}\right)^\eta$$

$$\leftrightarrow g_{12} \frac{\Delta I_1}{\sigma^2} \leq M\left(g_{22} \frac{\Delta I_2}{\sigma^2}\right)^\eta$$

where $$INR_{ji}(t) = \frac{P|\tilde{g}_{ji}(t)|^2}{\sigma^2} \quad (30)$$

Therefore, using the CQI feedback reports and the long-term estimate of the residual interference at each UE, the ITLinQ scheduling conditions can be verified or at least approximated.

After link scheduling is performed, the central scheduler 504 is aware of which TPs are being activated at the current scheduling interval and more accurate estimate of the achievable rate for each UE can be derived. Referring again to FIG. 9, the instantaneous rate estimate that the UE is receiving from $TP_1$ can now be refined as $$\tilde{r}_{11}(t) = \log_2\left(1 + \frac{P|h_{11}(t)|^2}{\delta I_1(t) + \sum_{i=2}^{3} P\gamma_i(t)|h_{1i}(t)|^2}\right) \quad (31)$$

$$= \log_2\left(1 + \frac{\frac{P|h_{11}(t)|^2}{\delta I_1(t)}}{1 + \sum_{i=2}^{3} \gamma_i(t)\frac{P|h_{1i}(t)|^2}{\delta I_1(t)}}\right) \quad (32)$$

$$\approx \log_2\left(1 + \frac{g_{11}(t)}{1 + \sum_{i=2}^{3} \gamma_i(t)g_{1i}(t)}\right) \quad (33)$$

where, compared to the rate estimate at the beginning of the scheduling interval, the central scheduler 504 or other apparatus has the exact binary knowledge of $\gamma_2(t)$ and $\gamma_3(t)$, which helps improve the rate estimation.

CQI reports can also be used to help adjust the transmission powers of the scheduled TPs. Using the aforementioned CQI reports, following the optimization approach described earlier herein with reference to Equation (5) the transmit power of $TP_i$, denoted by $P^*_i$, is in fact the solution to the following optimization problem:

$$\max_{P_i} \sum_{j=1}^{i-1} w_j \log\left(1 + \frac{P^*_j g_{jj}}{P_i g_{ji} \mathbb{1}(i \in C_j) + \sum_{k \in \{1,\ldots,i-1\} \cap C_j \setminus \{j\}} P^*_k g_{jk} + \sum_{k \in \{i+1,\ldots,n\} \cap C_j} Pg_{jk} + P}\right) +$$

-continued $$w_i \log\left(1 + \frac{P_i g_{ii}}{\sum_{j\in\{1,\ldots,i-1\}\cap C_i} P_j^* g_{ij} + \sum_{j\in\{i+1,\ldots,n\}\cap C_i} P g_{ij} + P}\right) + \sum_{j=i+1}^{n} w_j \log\left(1 + \frac{P g_{jj}}{P_i g_{ji} 1(i\in C_j) + \sum_{k\in\{1,\ldots,i-1\}\cap C_j} P_k^* g_{jk} + \sum_{k\in\{i+1,\ldots,n\}\cap C_j\setminus\{j\}} P g_{jk} + P}\right)$$

where $1(\cdot)$ denotes the indicator function and time indexing is omitted for brevity. Note that adjusting the transmit powers of the TPs in downlink will also impact the CQI measurements and feedback reports. To signal the power allocations in downlink, dedicated reference signals can be used for detection per sub-channel, or the power control decisions can be signaled through the control channel. Specifically, the interference measurements and the probabilities of the TPs in the network being turned on may need to be modified based on the adjusted transmission power levels of the TPs across the network.

As the TPs do not have access to the instantaneous CQI, TP estimates of the instantaneous rates may be optimistic or pessimistic, resulting in packet drops when the estimated rate is higher than the capacity. In order to reduce or eliminate packet drops, systems according to aspects use an outer loop link adaptation scheme based on an ACK/NACK (acknowledgement/negative acknowledgement) feedback by the UE indicating whether the transmission was successful or not at each scheduling interval.

The estimated SINR of a generic UE using the CQI feedback reports can be denoted by $SINR_{FB}$. The adjusted SINR that the TP will use for transmission rate calculation is denoted by $\widetilde{SINR}$ SINR and is derived as $$\widetilde{SINR}(dB) = SINR_{FB}(dB) + \Delta_{OLLA} \quad (34)$$

where $\Delta_{OLLA}$ is the OLLA adjustment of the SINR in dB.

The value of $\Delta_{OLLA}$ will evolve over time, and at each scheduling interval t, its value is updated as follows:

$$\Delta_{OLLA}(t) = \begin{cases} \Delta_{OLLA}(t) + \alpha\delta(t) & \text{if } ACK \\ \Delta_{OLLA}(t) - (1-\alpha)\delta(t) & \text{if } NACK \end{cases} \quad (35)$$

where $\alpha$ is the desired packet error rate (usually taken to be 0.1) and $\delta(t)$ is the adjustment step size, which can be reduced over time for convergence purposes. This implies that if the last transmission was successful, the SINR and rate estimates would become more aggressive, whereas if the last transmission failed, the SINR and rate estimates would become more conservative. Note that such an update is done on a per-user basis in general, while if dynamic cell selection (DCS) is involved as described above with reference to FIG. 7 and associated equations, then the update should be done per TP-UE link.

Interference Management in Ultra-Dense Networks with Sub-Band Scheduling

Methods and apparatuses according to some aspects manage interference in ultra-dense networks at the sub-band level.

Returning again to FIG. 5, it can be assumed that there are multiple resource blocks (RBs) across the frequency domain, each experiencing an independent fading level. The RBs are assumed to be partitioned into different sub-bands, with each sub-band including a set of adjacent RBs. Scheduling decisions can be done at the sub-band level. $g_{ji}(t, f)$ denotes the channel gain between $TP_i$ and $UE_j$ at scheduling interval t and sub-band f, consisting of both long-term components (corresponding to path-loss and shadowing) and short-term components (corresponding to short-term fading). This implies that at each scheduling interval t, assuming synchronous transmission of the TPs, the received signal of $UE_j$ on sub-band f can be written:

$$Y_j(t,f) = \sum_{i=1}^{N} g_{ji}(t,f) X_i(t,f) + Z_j(t,f) \quad (36)$$

where $X_i(t, f)$ denotes the transmit signal of $TP_i$ at scheduling interval t and sub-band f and $Z_j(t, f)$ denotes the additive white Gaussian noise at $UE_j$ in scheduling interval t and sub-band f.

Channel gain can be estimated and is denoted by $\tilde{g}_{ji}(t, f)$, and this estimate can be measured and fed back periodically (or upon network request) by the UEs to the network. As an example, a CQI feedback mechanism as described above can be implemented by UEs in the wireless network 500, and such feedback can be implemented on a per-sub-band basis. Note that the sub-band size for the CQI feedback reports might be different from the size of sub-bands for the purpose of scheduling. The set of RBs corresponding to the scheduling sub-band $f_{sch}$ is denoted by $RBs(f_{sch})$ and the set of RBs corresponding to the CQI sub-band $f_{CQI}$ by $RBs(f_{CQI})$. Then, for any pair $(TP_i, UE_j)$ and any scheduling sub-band $f_{sch}$, if there exists a CQI sub-band $f_{CQI}$ such that $RBs(f_{sch}) \subseteq RBs(f_{CQI})$, then $\tilde{g}_{ji}(t, f_{sch}) = \tilde{g}_{ji}(t, f_{CQI})$. Otherwise, there should exist a set of CQI sub-bands $\{f_{CQI,1}, \ldots, f_{CQI,M}\}$ such that $RBs(f_{sch}) = \cup_{m=1}^{M} RBs(f_{CQI,m})$. In the latter case, $TP_i$ can calculate an effective CQI on all of these bands to obtain a unique CQI value for the desired scheduling sub-band. One type of effective CQI calculation, for example, can be the following:

$$\tilde{g}_{ji}(t, f_{sch}) = 2^{\left(\frac{1}{M}\sum_{m=1}^{M}\log_2(1+\tilde{g}_{ji}(t,f_{CQI_m}))\right)} - 1 \quad (37)$$

which considers averaging in the log-domain and then converting back to the actual domain.

Having access to the CQI values for each scheduling sub-band, user scheduling and link scheduling can be implemented at the central scheduler 504 or other apparatus as described below.

As with other aspects described above, each TP maintains a list of the UEs associated with it, denoted by $L_i$. In particular, if $PL_{ji}$ denotes the combined path-loss and shadowing between $TP_i$ and $UE_j$, then $$L_i = \left\{j \in \{1, \ldots, K\} : i = \underset{i'}{\arg\max} PL_{ji'}\right\} \quad (38)$$

Without loss of generality, it can be assumed that each TP has at least one UE associated with it (for all $i \in \{1, \ldots, N\}$, $|L_i| \neq 0$). TPs with no assigned UEs will be dropped in further operations as needed and as described below. As described earlier herein with respect to Equation (2), the UE list of each TP is ordered according to a given priority criterion, for example proportional fairness (PF). On a sub-band level according to aspects, at the start of scheduling interval t, the PF ratio for each $UE_j$ on sub-band f as $$PF_{j,f} = \frac{\tilde{r}_j(t, f)}{R_j(t-1)} \quad (39)$$

where $\tilde{r}_j(t, f)$ denotes the estimated instantaneous rate that $UE_j$ receives from $TP_{i_j}$ in the scheduling interval t and sub-band f.

Each $TP_i$ forms an $|L_i| \times F$ matrix $PF_i$ that includes the PF ratios of its associated users across all F scheduling sub-bands. For example, the $(j, f)^{th}$ element of this matrix corresponds to the PF ratio of $UE_j$ on sub-band f. After forming this matrix, $TP_i$ can pick the maximum element of $PF_i$. Let the row and column of the maximum entry be denoted by $(j_1, f_1)$. Then, the TP can schedule $UE_{j_1}$ on sub-band $f_1$. Then, $TP_i$ can set all PF values in the $f_1{}^{th}$ column of the PF matrix $PF_i$ to zero ($PF_i(j, f_1)=0$, $\forall j \in L_i$), indicating that sub-band $f_1$ has already been occupied. Moreover, in case of non-full buffer traffic, the PF ratio of user $UE_{j_1}$ on the unoccupied sub-bands may be updated to reflect the number of bits remaining in a prospective buffer that the TP maintains for all of the TP's associated UEs. The TP can then select the next maximum value of the updated $PF_i$ matrix, schedule the corresponding UE on the corresponding sub-band, update the matrix and so on. This process continues until all elements of the PF matrix are zero, indicating that either the buffers of the UEs are perceived to be completely empty, or all bands have been occupied with scheduled users.

Figure 12D:
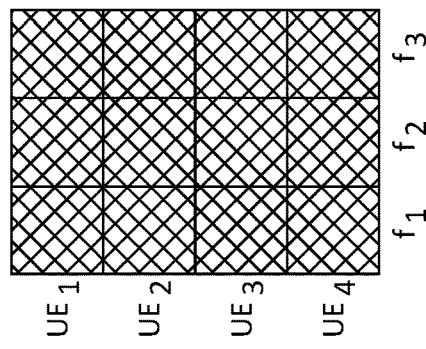
FIG. 12D illustrates a PF matrix after scheduling of three users according to some aspects.
Figure 12C:
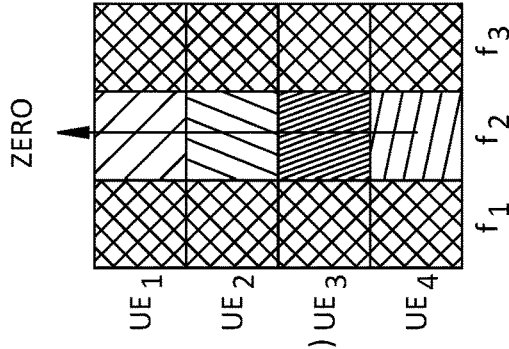
FIG. 12C illustrates a PF matrix after scheduling of two users according to some aspects.
Figure 12B:
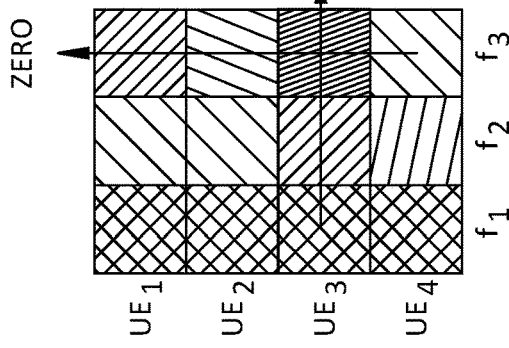
FIG. 12B illustrates a PF matrix after scheduling of one user according to some aspects.
Figure 12A:
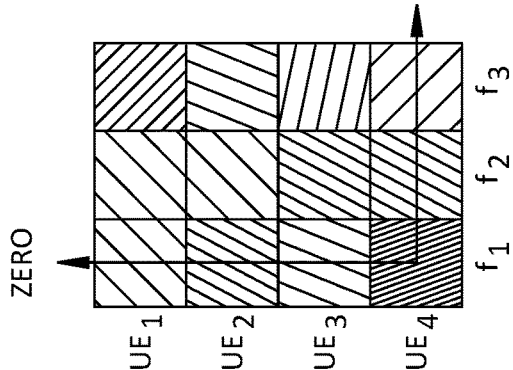
FIG. 12A illustrates a proportional fairness (PF) matrix at the beginning of a user scheduling process according to some aspects.

FIGS. 12A, 12B, 12C and 12D illustrate the user scheduling process described above according to some aspects. FIG. 12A illustrates a proportional fairness (PF) matrix at the beginning of a user scheduling process according to some aspects. In the illustrated example, three sub-bands f1, f2 and f3 are available. Four UEs UE1, UE2, UE3 and UE4 are associated to the TP. PF values are provided for each entry. UE4 on sub-band f1 has the highest PF entry in the illustrated example. Accordingly, the TP will schedule UE4 on sub-band f1 and zero out sub-band f1 indicating that sub-band f1 is occupied.

FIG. 12B illustrates a PF matrix after scheduling of one user according to some aspects. As can be seen in the illustrated example, sub-band f1 is unavailable. UE3 on sub-band f3 now has the highest PF. Accordingly, the TP will schedule UE3 on sub-band f3 and zero out sub-band f3 indicating that sub-band f3 is occupied.

FIG. 12C illustrates a PF matrix after scheduling of two users according to some aspects. As described above, UE3 and UE4 have been scheduled, and f1 and f3 are occupied and no longer available. UE3 on sub-band f2 now has the highest PF. Because a UE can be scheduled on more than one sub-band, the TP will schedule UE3 on sub-band f2 and zero out sub-band f2 indicating that sub-band f2 is occupied.

FIG. 12D illustrates a PF matrix after scheduling of three users according to some aspects. As can be appreciated by studying FIG. 12D, no sub-bands are available. At this point, user scheduling has been completed until the next scheduling interval.

User scheduling shown in FIGS. 12A, 12B, 12C and 12D was sequential over all of the sub-bands, but other scheduling methodologies can be contemplated and aspects are not limited to sequential scheduling.

Each TP can also schedule two UEs at the same time and use superposition coding to send desired messages to both the primary and secondary UEs. The primary UE will treat the message of the second UE as noise, while the secondary UE first decodes and subtracts the message of the first UE to decode its own messages. This approach was described earlier herein with reference to Equations (8) and (9).

For the case of sub-band user scheduling with NOMA, each TP can schedule primary UEs as described above. After the primary UEs are selected, the TPs will search for potential secondary NOMA UEs for whom scheduling can enhance the weighted sum-rate of the scheduler outcome. In particular, let $(j_1, \ldots, j_i)$ denote the tuple of primary scheduled UEs by $TP_i$, where their scheduling order based on their respective PFs is preserved. Moreover, assume that each UE $j_{i'}$ has been scheduled on a subset of sub-bands denoted by $F_{i'}$. In some aspects, the NOMA user pairings can be such that the pairings on different sub-bands are either completely identical or disjoint.

To that end, $TP_i$ starts by considering $UE_{j_1}$ as the primary UE and can search for a potential secondary NOMA $UE_{j'_1}$, $j'_1 \in L_i \setminus \{j_1, \ldots, j_i\}$ to be scheduled on all sub-bands in $F_1$. In particular, for each $j'_1 \in L_i \setminus \{j_1, \ldots, j_i\}$, the TP can determine whether either $UE_{j_1}$ or $UE_{j'_1}$ is the stronger UE in all sub-bands in $F_1$ in terms of CQI. If so, then the TP derives optimal NOMA power allocation variables $\beta_f$ as described above with reference to Equations (8) and (9) for each sub-band $f \in F_1$. The TP then determines whether $\beta_f \in [0.5, 1]$, for each $f \in F_1$. If so, then $UE_{j'_1}$ is a potential NOMA UE for sub-bands $F_1$ with the NOMA power allocation variable $$\beta_{j'_1} = \frac{1}{|F_1|} \sum_{f \in F_1} \beta_f,$$

which by definition is also between 0.5 and 1. The TP can perform these operations for all candidate NOMA UE and then compare the maximum NOMA weighted sum-rate among the candidate NOMA UEs and with the single-user weighted sum-rate of $UE_{j_1}$ across all sub-bands in $F_1$. If NOMA helps improve the weighted sum-rate, then the TP may switch to NOMA across all sub-bands in $F_1$. Otherwise, the TP may remain in the single-user mode.

Subsequent to the user scheduling described above, the network 500 will include N TPs, each with one or two scheduled UE pairs on each of the F sub-bands. Link scheduling (e.g., determining whether a given TP should be activated) can proceed according to aspects using any of the algorithms described in the disclosure, on each sub-band in parallel. If NOMA had also been involved in the user scheduling phase, after the link scheduling is done, the NOMA power allocation variables can be updated after link scheduling is completed, based on the resultant pattern of interference on different sub-bands across the network 500.

Figure 13:
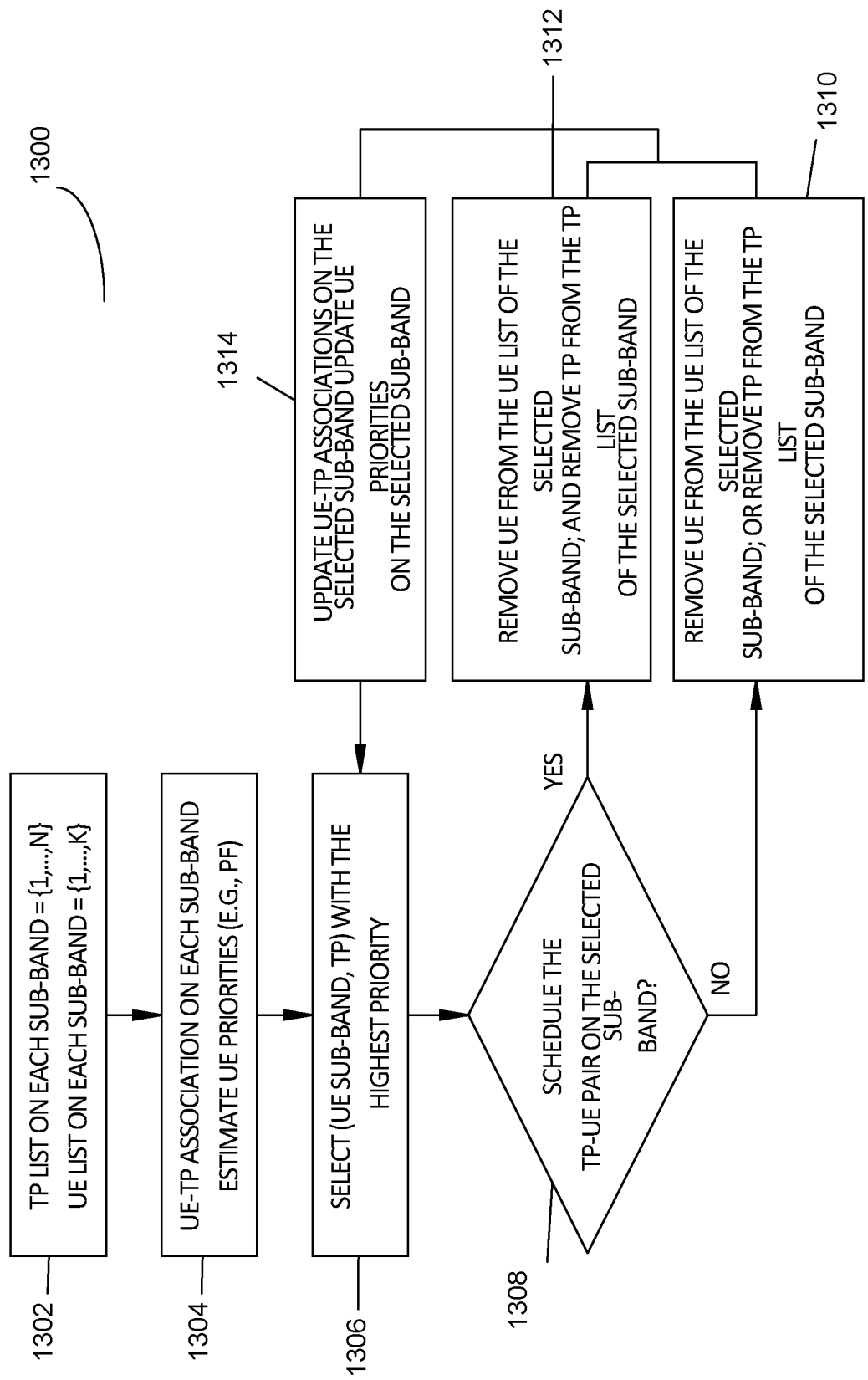
FIG. 13 illustrates a method for sub-band dynamic cell selection and link scheduling according to some aspects.

User scheduling and link scheduling can be performed together in a method 1300 similar to that illustrated in FIG. 13. As seen at operation 1302, the dynamic cell selection (DCS) algorithm described earlier herein (FIG. 7 and associated text) has been generalized to include the case where multiple sub-bands are available and a list is maintained (by, e.g., the central scheduler 504) of available TPs and a list of available UEs for all F scheduling sub-bands that are available.

The sub-band DCS algorithm shown in FIG. 13 can also be considered as an extension of the sub-band scheduling algorithm mentioned above with reference to FIGS. 12A, 12B, 12C and 12D, with an added dimension to the local user priority matrices maintained by each TP as depicted at operation 1304. In the DCS algorithm of FIG. 13, the central scheduler 504 estimates a 3-dimensional $K \times F \times N$ priority matrix for the UEs across the network 500, e.g., using the PF ratios. For any tuple (j, f, i)∈{1, . . . , K}×{1, . . . , F}× {1, . . . , N}, the (j, f, i)$^{th}$ entry of this matrix represents the PF ratio of UE$_j$ on sub-band f if served by TP$_i$. This provides the freedom for the UEs to be served by any available TP in the network 500 on any of the sub-bands.

Method 1300 continues with operation 1306 by selecting the (UE, sub-band, TP) tuple whose corresponding entry has the highest PF ratio in the entire PF matrix of the network 500. This and other operations of method 1300 can be performed centrally, for example by processing circuitry 502 of central scheduler 504.

Method 1300 continues with operation 1308 with the central scheduler 504 checking whether the selected TP-UE pair should be scheduled on the selected sub-band. The decision can be based on any link scheduling criterion, such as ITLinQ. If the link scheduling criteria are not satisfied, either the TP or the UE will be removed from the selected sub-band in operation 1310. Otherwise, the pair will be scheduled on the selected sub-band, and the TP and UE will be respectively removed from the set of available TPs and the set of available UEs on the selected sub-band in operation 1312. The unavailability of the scheduled TP on the selected sub-band may affect other UEs which are not yet scheduled on the selected sub-band. Therefore, the rest of the UEs which were associated with the selected TP should be associated with the next strongest available TP on the selected sub-band and their PF ratios also need to be updated in operation 1314. The algorithm then continues in the same fashion to select the next best (UE, sub-band, TP) tuples until we run out of either available TPs or available UEs on all the sub-bands.

For the case of non-full buffer traffic, the scheduler maintains a prospective buffer size for all the UEs, which gets updated as the UEs are being scheduled on the sub-bands. This implies that during the scheduling process, the PF ratio of any scheduled UE may be modified in the yet-to-be-scheduled sub-bands to reflect the size of the remaining bits in its prospective buffer.

The method 1300 can be expanded to include checking of interference criteria such as ITLinQ criteria. In at least these aspects, after selecting the best (UE, sub-band, TP) tuple in each iteration in operation 1306, the central scheduler 504 can check whether the selected UE is receiving strong interference from the TPs that have already been scheduled on the selected sub-band. If so, the UE will be removed from the selected sub-band. Otherwise, the central scheduler 504 can also check whether the TP is causing strong interference at the UEs already scheduled on the selected sub-band. If so, the TP will be removed from the selected sub-band. However, if all incoming and outgoing interference levels are weak enough, then the TP-UE pair will be scheduled on the selected sub-band, and the algorithm continues to find the next best (UE, sub-band, TP) tuples by iteratively repeating operations starting with operation 1306.

The method 1300 can also be expanded to include NOMA considerations. In at least these example aspects, once single-UE scheduling is completed, the central scheduler 504 can go through each of the scheduled TP-UE pairs and search for a potential secondary NOMA UE that can help improve the weighted sum-rate that the TP can achieve over all the scheduled sub-bands of this pair. The scheduling is complete after all pairs have been examined for a potential NOMA UE addition.

Decentralized Link Scheduling Using Multi-Agent Deep Reinforcement Learning

In some aspects, link scheduling can be performed in a decentralized fashion. For example, rather than a central scheduler (e.g., central scheduler 504 (FIG. 5)) deciding whether each TP should be on or off, the TPs themselves can make on/off decisions. In at least these aspects, TPs can implement algorithms based on deep Q networks (DQN) and policy gradients (PG) to decide whether it should stay on or become silent. Link scheduling according to these accepts can be more scalable to networks using large numbers of TPs, relative to centralized link scheduling.

In at least these aspects, each TP in the network operates as a reinforcement learning agent, which interacts with the wireless network environment, by having a local observation of the environment, taking actions (being on/off) and receiving a reward at each scheduling interval. Methods according to aspects use the experiences of all reinforcement learning agents to tune the scheduling algorithm used by all the agents via deep reinforcement learning.

In some examples, each TP can have access to CQIs provided as feedback by UEs as described earlier herein with reference to FIGS. 9-11 and the accompanying text. Having access to the CQI values, each TP maintains a list of its associated UEs to which it has, for example, the highest levels of reference received signal power (RSRP). L$_i$ denotes the list of UEs associated with TP$_i$. Then, at each scheduling interval, each TP selects one of the UEs from its association list to serve at the current interval. The UE scheduling criterion can be based on, for example, a priority criterion for the UEs, such as proportional fairness (PF) as has been described previously with respect to other aspects.

After the user scheduling phase, the network 500 will include N TP-UE pairs. In such a network, some TPs should be turned off (e.g., enter an idle state, refrain from transmitting, or turn off a power switch) such that the rest of the transmissions incur minimal levels of interference on each other. To that end, some aspects provide a decentralized approach, where each TP receives a local observation of the wireless network at the current interval, based on which each TP should decide whether it stays on/off without knowledge of what the rest of the TPs are doing. These and other aspects can use reinforcement learning (RL) paradigms.

The RL paradigm consists of an agent and an environment interacting with each other. The agent takes actions over time, and each such action influences the next state of the environment. Moreover, the environment emits a reward to the agent once the action is taken, and transitions to the next state, which can be observed by the agent to take the next action. The goal is for the agent to take actions so as to maximize its cumulative future reward.

Expressed mathematically, at each time step t, the agent observes state $s_t$, takes an action $a_t$, and receives scalar reward $r_t$. The environment receives action $a_t$, emits a scalar reward $r_t$, and transitions to state $s_{t+1}$. The transitions of the environment state is assumed to follow a Markov Decision Process (MDP).

The RL agent needs to learn a policy π, which is defined as a behavior function mapping the state space to the action space. For example, at each time step t, the agent takes the action $a_t = \pi(s_t)$. The goal of the agent is to learn a policy which maximizes a value function, for example, discounted cumulative reward defined as:

$$Q^\pi(s_k) = \Sigma_{t=k}^{\infty} \gamma^{t-k} r_t = r_k + \gamma r_{k+1} + \gamma^2 r_{k+2} + \ldots \qquad (40)$$

where γ is a discount factor in the interval [0,1).

One way to learn such an optimal policy is through a technique called Q-learning. This technique assigns a function Q(s, a) to each state-action pair, which is defined as the maximum discounted cumulative reward when we perform action a in state s, and continue optimally from that point on:

$$Q(s_t, a_t) = \max Q^\pi(s_t) \quad (41)$$

Assuming the Q function is available, at each time step t, the agent takes the action with the highest Q-value:

$$\pi(s_t) = \underset{a}{\operatorname{argmax}} Q(s_t, a) \quad (42)$$

To find the Q function however, the Bellman equation is solved:

$$Q(s, a) = r(s, a) + \gamma \underset{a'}{\max} Q(s', a') \quad (43)$$

The Bellman equation states that the maximum future reward for the current state and action is the immediate reward plus maximum future reward for the next state. In Equation (43), s' denotes the next state resulting from taking action a at state s. If the number of states are finite and small, one can resort to a look-up table approach to learn the Q function. However, if the number of states are infinite, one can use, for example, a neural network (NN) to represent the Q function. A deep Q-network (DQN) is a neural network taking the state as an input and outputting the Q values for different actions given the input state. Such a neural network can be trained, through the past experiences of the agent, so as to predict the desired Q-values for any given state with high precision. This extends the conventional reinforcement learning to what is known as deep reinforcement learning, which is used by TPs in some aspects for link scheduling.

In link scheduling according to some aspects, each of the N TPs is defined to be an individual deep RL agent, interacting with the wireless network 500 (and accordingly with other TPs in the network 500). At each scheduling interval t, it can be assumed that each of the N agents has a local observation of the wireless network 500. In particular, it is assumed that at scheduling interval t, each agent i∈{1, ..., N} receives a local observation $o_{i,t}$ with joint observation probability $P(o_{1,t}, \ldots, o_{N,t}|s_t)$, where $s_t$ is the environment state at scheduling interval t.

Based on its local observation $o_i$, each agent i then executes action $a_{i,t}$∈{0,1}, resulting in the joint action vector $a_t = [a_{1,t}, \ldots, a_{N,t}]$, which represents the scheduling decisions of all the TPs across the network 500.

Based on this joint action vector, each agent i receives a reward $r_{i,t} = R_i(s_t, a_t)$. This indicates that the reward of each agent may depend on the action of all agents. The joint action vector causes the environment to transition to state $s_{t+1}$ with transition probability $P(s_{t+1}|s_t, a_t)$.

In aspects, the environment state is considered to include an N×N matrix of channel quality indicator (CQI) feedback reports from the scheduled UEs; long-term average rates of all UEs; and the probability of each TP being on (estimated from previous intervals)

Agent local observations of each agent i include signal-to-noise ratio (SNR) CQI between $TP_i$ and its scheduled UE; CQI regarding the top-x (where x is any positive integer) incoming interfering links (received by the scheduled UE of $TP_i$) in descending order; CQI regarding the top-x outgoing interfering links (caused by $TP_i$) in descending order; weight of the scheduled UE of $TP_i$, defined for example as the inverse of its long-term average rate; and estimated link capacity between $TP_i$ and its scheduled UE.

The scalability of link scheduling according to these aspects is enhanced by the fact that the size of agents' local observations is constant, because the number of inputs to the DQN of some aspects does not scale with the network density. Moreover, the same DQN can still be used even if an agent joins/leaves the network 500.

The action space of each agent is assumed to be the scheduling decision of its corresponding TP, or {0,1} (e.g., on/off), or any other set of discrete transmit power levels. Rewards at each scheduling interval can include any function of the resulting throughput of the UEs such as the weighted sum-rate achieved by all the UEs across the network.

Rewards can also be decentralized in some aspects of deep RL scheduling. For example, in some aspects, the reward of each agent is the individual rate of its own scheduled UE (decentralized reward) as opposed to the weighted sum-rate across the entire network 500. In at least these aspects, a policy gradient (PG) algorithm can be used. While the DQN approach tries to learn a state-action value function (the Q-function), the PG approach tries to learn a (possibly stochastic) policy directly instead of a Q function that maximizes the expected reward using gradient methods.

Figure 14:
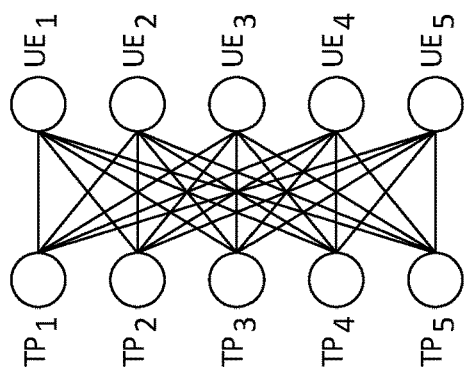
FIG. 14 illustrates a training mechanism for a network with a number of policy gradient agents according to some aspects.

FIG. 14 illustrates a training mechanism for a network with a number of policy gradient agents according to some aspects. For a 5×5 wireless network with 5 agents symbolized on the left side of FIG. 14, for each instance of the environment (dropping of different TPs and UEs), the network 500 can be run for a number (e.g., 1000) scheduling intervals. At the end of each drop, as shown in the chart on the right side of FIG. 14, the cumulative reward of agent i at scheduling interval t∈{201, ..., 600} can be calculated according to $$\frac{1}{1001-t}\sum_{t'=t}^{1000} R_i(t'),$$

which indicates the mean achieved rate starting from scheduling interval t.

Interference Management in V2X Communications

Some aspects also apply to V2X communications, particularly within the ultra-dense networks described above. As the number of autonomous and connected vehicles grows, the number of wireless connections on the roads will increase, increasing the simultaneous access to same channels by thousands of vehicles. Autonomous and connected vehicles will be constantly relying on connectivity (cellular, Wi-Fi, Bluetooth, etc.) for high-definition maps and other data-intensive services, and there will also be an increase in machine-type (small data) communications vying for the same channels. Many vehicles on the market today already provide a Wi-Fi hotspot with a cellular backhaul for the passengers. As the number of connections (and devices) increases, there is greater potential for interference. Channel allocation becomes more important, and aspects provide for improved channel allocation that helps reduce or eliminate interference.

Aspects provide at least two solutions to channel allocation issues. A network-assisted solution is provided that uses Multi-Access Edge Computing (MEC), in which the computation is done at the network edge with local information and reduced latency. Another solution, in some aspects, uses machine learning (ML) at the edge or in a distributed manner by the vehicles or a hybrid model. Aspects using ML use historic data to optimize the channel allocation based on aspects such as trajectory of the vehicles, road topology, applications types, channel allocation by other vehicles, and their radio resource requirements. A hybrid solution using both MEC and ML is also provided in some aspects.

Figure 15:
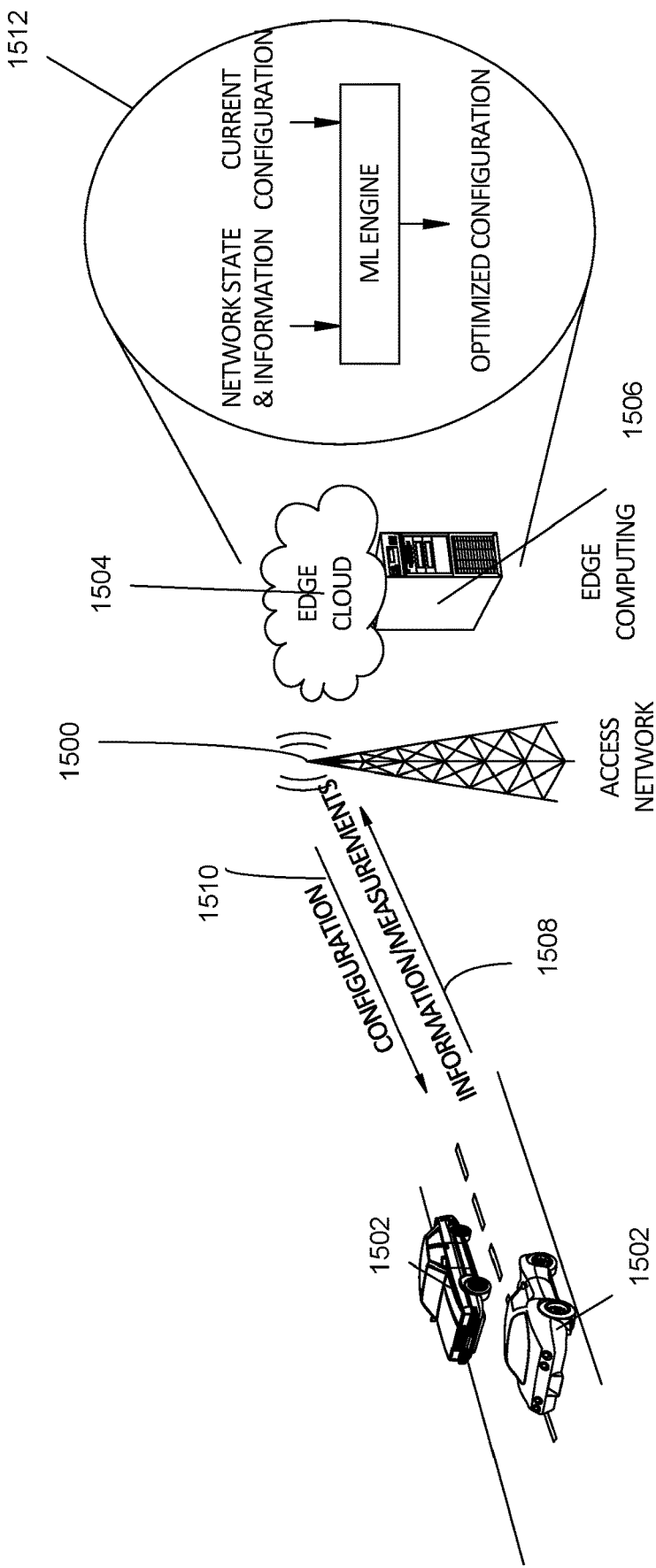
FIG. 15 illustrates machine learning-based multi-access edge computing according to some aspects.

FIG. 15 illustrates machine learning-based multi-access edge computing according to some aspects. Aspects can make use of network infrastructure 1500 in channel selection. Local information is used to select the optimized configuration for mobile BSSs 1502 (e.g., vehicles). This information can be processed at the core, in the cloud 1504, at the access network/network edge 1506, or a combination thereof. The information 1508 can include operating channel information collected from vehicles; measured interference collected from vehicles; existing networks/occupied channels information; travel route of the vehicle; road topology; type of traffic to and from each vehicle (e.g., information regarding data size, quality of service (QoS) requirements, etc.); expected duration of the service consumed by the vehicle; service category (e.g., entertainment, etc.); and other types of information.

The determined configuration is communicated to the vehicles at 1510 using the backhaul connection to the network and may include information about duration or locality of validity of the information. Configuration information can include at least identification information of the channel/s to be used, aggregation information, transmit power, etc.

These and other aspects can be used alone or in conjunction with ML-based solutions implement at network or infrastructure elements as shown at 1512. In ML-based solutions, historical information available from vehicles, including at least the information described above, as well as information available at the network, contextual information (e.g., expected congestion, predicted service consumption and road density, etc.) are used to train network elements to predict an optimal channel allocation. ML-based solutions can also be implemented at the vehicles (not shown in FIG. 15) to learn the optimal/correct configuration, channel, power, etc. for trips typically taken by the respective vehicle. Accordingly vehicles can make real-time decisions to switch channels without input from network elements.

Figure 16:
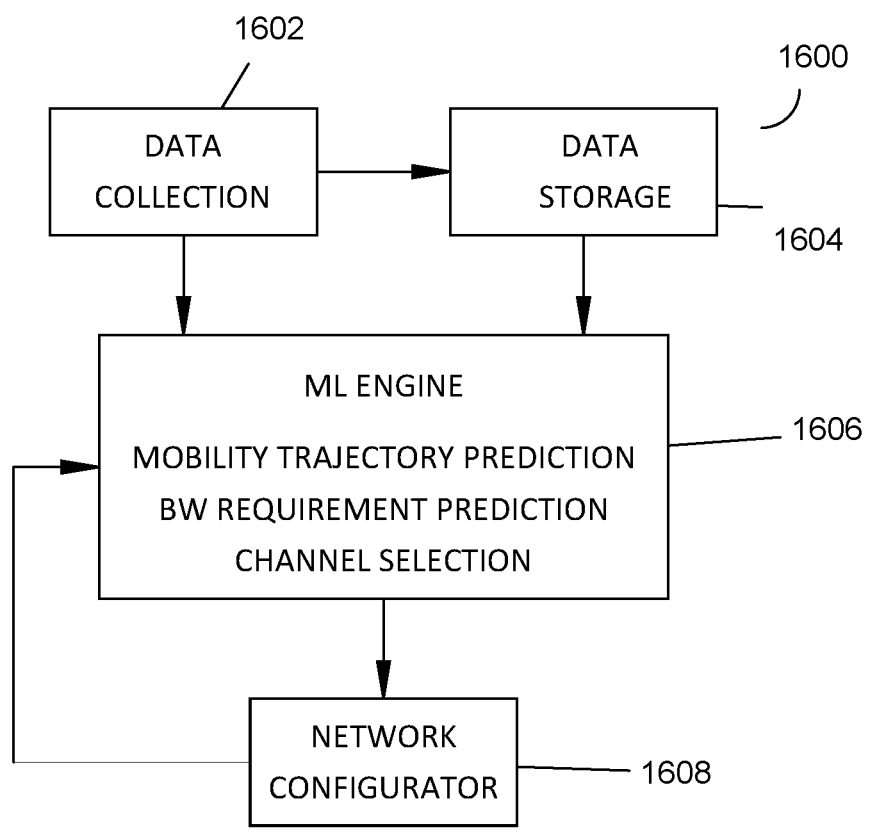
FIG. 16 illustrates a machine learning solution for channel allocation in a vehicle according to some aspects.

FIG. 16 illustrates a machine learning solution 1600 for channel allocation in a vehicle according to some aspects. Any of the aspects shown can be implemented in the machine 1700 (FIG. 17) described later herein or can make use of any component of FIGS. 1-4 as described earlier herein. For example, data collection circuitry 1602 can collect relevant data, including measured interference/noise on different channels, application bandwidth requirements, concurrent applications at the vehicle leveraging similar or different interfaces, location, day/time, vehicle occupancy, spatial information, traffic info, etc. the data collection circuitry 1602 can provide this data for storage at data storage 1604. The data collection circuitry 1602 can also provided this data as input to the ML engine.

Using data from the data collection circuitry 1602 and the data storage 1604, the ML engine 1606 can create a model for mobility trajectory prediction, which predicts the route or other locational data for vehicles and other UEs. The ML engine 1606 can also predict bandwidth requirements of vehicles and perform channel selection after making predictions based on the models created. The ML engine can provide channel selection or other inputs to the network configurator 1608, which implements the dynamic channel selection (with possible channels aggregation according to services bandwidth requirement and category) and possibly other relevant network configurations.

In a hybrid solution, in some aspects, distributed ML processing is implemented and the vehicles share the result of learning models with the network, which uses that information as an input to its own model. This approach results in lower latency, more accuracy and a more efficient solution at least because not all the contextual data will be transmitted to the network.

In an alternative solution, in some aspects, distributed ML processing is implemented in the vehicle and the vehicle can itself make a channel selection or other configuration change based on the learned information. The vehicle shares can share channel expected status or other learned information throughout the rest of the current trip. The network can use the channel current status and predicted status information to arbitrate other dynamic channel allocation in the same road segment.

Other Apparatuses

Figure 17:
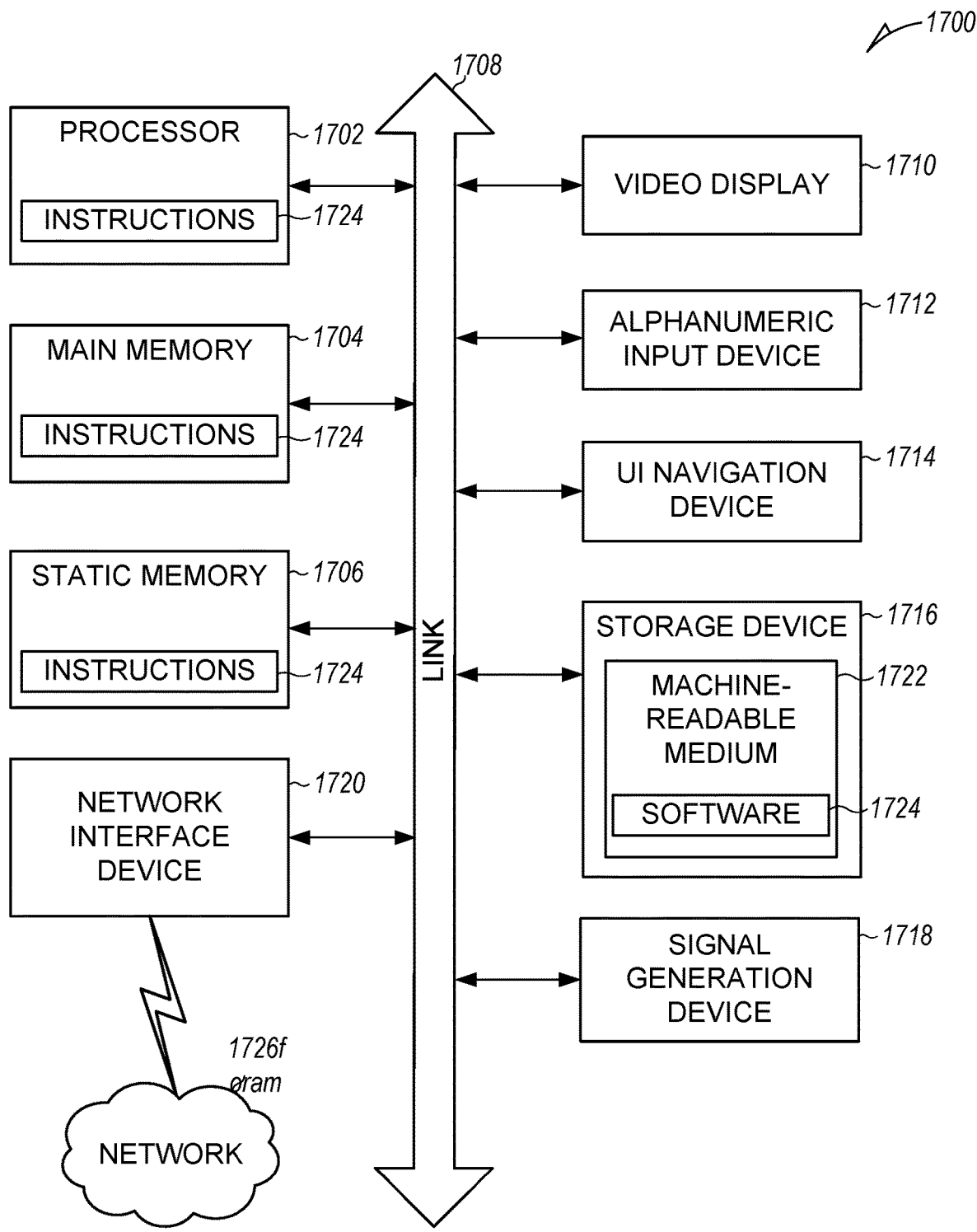
FIG. 17 illustrates a block diagram of an example machine upon which any one or more of the techniques (e.g., methodologies) discussed herein may perform.

FIG. 17 illustrates a block diagram of an example machine 1700 upon which any one or more of the techniques (e.g., methodologies) discussed herein may perform. In alternative aspects, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710, an alphanumeric input device 1712 (e.g., a keyboard), and a user interface (UI) navigation device 1714 (e.g., a mouse). In an example, the display unit 1710, alphanumeric input device 1712 and UI navigation device 1714 may be a touch screen display. The machine 1700 may additionally include a storage device (e.g., drive unit) 1716, a signal generation device 1718 (e.g., a speaker), a network interface device 1720.

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine-readable media.

While the machine readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1724 may further be transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.6 family of standards known as Wi-Fi®, IEEE 802.16 family of standards known as WiMax®), IEEE 802.15.4 family of standards, peer-to-peer (P2P) networks, among others. In an example, the network interface device 1720 may include one or more physical jacks (e.g., Ethernet, coaxial, or phone jacks) or one or more antennas as discussed above with reference to FIG. 3, to connect to the communications network 1726. In an example, the network interface device 1720 may include a plurality of antennas to wirelessly communicate using at least one of single-input multiple-output (SIMO), MIMO, or multiple-input single-output (MISO) techniques. The term "transmission medium" shall be taken to include any intangible medium that is capable of storing, encoding or carrying instructions for execution by the machine 1700, and includes digital or analog communications signals or other intangible medium to facilitate communication of such software.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 includes subject matter (such as a device, an electronic apparatus (e.g. circuit, electronic system or both), or a machine) including memory to maintain a list of pairs of user equipments (UEs) and transmit points (TPs) within an area; and processing circuitry coupled to the memory, the processing circuitry configured to designate an order for the list of pairs based upon a priority criterion, a first pair of the list of pairs having a highest priority based on the priority criterion; and provide a message to a first TP corresponding to the first pair, the message including an instruction to adjust transmission power to a first optimized power level based on an optimization function.

In Example 2, the subject matter of Example 1 may optionally include wherein the processing circuitry is further configured to provide a message to a second TP corresponding to a second pair of the list of pairs, the second pair having a lower priority than the first pair, the message including an instruction to adjust transmission power to a second optimized power level based on the optimization function and based on the first optimized power level.

In Example 3, the subject matter of Example 2 may optionally include wherein if the optimized power level is less than or equal to about 10% of full transmission power for a TP within the area, the processing circuitry is configured to instruct the respective TP to turn off.

In Example 4, the subject matter of any of Examples 2-3 may optionally include wherein the processing circuitry is configured to provide messages to TPs sequentially according to priority of a respective pair of the list of pairs.

In Example 5, the subject matter of any of Examples 1-4 may optionally include wherein the priority criterion includes a proportional fairness criterion.

In Example 6, the subject matter of any of Examples 1-5 may optionally include wherein the optimization function includes a weighted sum rate function.

In Example 7, the subject matter of Example 6 may optionally include wherein at least one pair of the list of pairs operates in non-orthogonal multiple access (NOMA), and wherein the order for the list of pairs is based on a weighted NOMA sum rate.

In Example 8, the subject matter of Example 6 may optionally include wherein the optimization function is further based on actual channel gain between a TP of a pair of the list of pairs and a respective UE of the pair.

In Example 9, the subject matter of any of Examples 1-8 may optionally include transceiver circuitry and wherein the processing circuitry is coupled to the transceiver circuitry and configured to provide the message over a control channel using the transceiver circuitry.

Example 10 includes subject matter (such as a device, an electronic apparatus (e.g. circuit, electronic system or both), or a machine) comprising memory to maintain a list of user equipments (UEs) and transmit points (TPs) within an area; and processing circuitry coupled to the memory, the processing circuitry configured to associate each UE of the list of UEs with a serving TP of the list of TPs based on a value representative of signal strength between each UE and the serving TP; determine, for each UE of the list of UEs, and sequentially in an order based on priority of each UE of the list of UEs, whether the respective serving TP is to be activated; and provide a message to the respective serving TP based on whether the respective serving TP is to be activated.

In Example 11, the subject matter of Example 10 may optionally include wherein the value representative of channel strength includes long-term channel gain.

In Example 12, the subject matter of any of Examples 10-11 may optionally include wherein the processing circuitry is further configured to perform the associating periodically and according to a scheduling interval.

In Example 13, the subject matter of Example 12 may optionally include wherein the processing circuitry is configured to determine whether a serving TP is to be activated based on at least one of an interference level generated by the respective serving TP and an interference level received by the scheduled UE.

In Example 14, the subject matter of Example 12 may optionally include wherein the processing circuitry is configured to remove a UE from the list of UEs, for at least the scheduling interval, if interference seen at the UE is above a threshold.

In Example 15, the subject matter of Example 12 may optionally include wherein the processing circuitry is configured to remove a TP from the list of TPs, for at least the scheduling interval, if interference produced by the TP is above a threshold.

Example 16 includes subject matter (such as a device, an electronic apparatus (e.g., circuit, electronic system, or both), or a machine) including transmit circuitry; receive circuitry to measure received signal power from one or more dominant transmit points (TPs); and processing circuitry coupled to the transmit circuitry and to the receive circuitry and configured to provide estimated signal-to-interference-plus-noise ratios (SINRs) relevant to each of the one or more dominant TPs; and encode feedback information indicative of the estimated SINRs for transmission to a central scheduler.

In Example 17, the subject matter of Example 16 may optionally include wherein the processing circuitry is further configured to determine members of a report set of TPs based on reference signal received power (RSRP) for one or more TPs.

In Example 18, the subject matter of any of Examples 16-17 may optionally include wherein the receive circuitry is further configured to measure aggregate interference caused by one or more non-dominant TPs.

In Example 19, the subject matter of any of Examples 16-18 may optionally include wherein the processing circuitry is further configured to report the feedback information periodically according to a periodicity that is based on a scheduling interval within a wireless communication network including at least the apparatus and a report set of TPs.

Example 20 includes subject matter (such as a device, an electronic apparatus (e.g., circuit, electronic system, or both), or a machine) including memory to store a list of sub-bands, a list of transmit points (TPs), and a list of user equipments (UEs) available to be scheduled in a wireless communication network; and processing circuitry coupled to the memory and configured to estimate a three-dimensional matrix for the list of UEs that includes a priority criterion value for each of the UEs calculated for each sub-band if served by each TP of the list of TPs; select an entry of the three-dimensional matrix that has a highest value for the priority criterion; and schedule a corresponding UE/TP pair to operate on the corresponding sub-band represented in the entry.

In Example 21, the subject matter of Example 20 may optionally include wherein the processing circuitry is further configured to remove the UE represented in the UE/TP pair from the list of available UEs subsequent to scheduling the corresponding UE/TP pair.

In Example 22, the subject matter of Example 21 may optionally include wherein the processing circuitry is further configured to remove the TP represented in the UE/TP pair from the list of available TPs subsequent to scheduling the corresponding UE/TP pair.

In Example 23, the subject matter of any of Examples 20-22 may optionally include wherein the priority criterion includes a proportional fairness criterion.

In Example 24, the subject matter of any of Examples 20-23 may optionally include wherein at least one TP can serve more than one UE in non-orthogonal multiple access (NOMA) mode.

In Example 25, the subject matter of any of Examples 20-24 may optionally include wherein the processing circuitry is configured to execute the scheduling periodically based on a scheduling interval for the wireless communication network.

In Example 26, the subject matter of any of Examples 20-25 may optionally include wherein the processing circuitry is further configured to prevent at least a subset of the list of TPs from transmitting on a subset of the list of sub-bands.

Example 27 includes subject matter (such as a device, an electronic apparatus (e.g., circuit, electronic system, or both), or a machine) including memory to store a list of user equipments (UEs) associated with the apparatus; and processing circuitry coupled to the memory and configured to make a scheduling decision based on a local observation of a wireless network within which the apparatus is operating.

In Example 28, the subject matter of Example 27 may optionally include wherein the scheduling decision includes a decision as to whether to power down the apparatus for at least a scheduling interval.

In Example 29, the subject matter of Example 28 may optionally include wherein the scheduling decision is made based on reinforcement learning, and wherein the apparatus includes at least one aspect of a deep Q-network agent.

Example 30 includes subject matter (such as a device, an electronic apparatus (e.g., circuit, electronic system, or both), or a machine) including memory to store information received from a plurality of user equipments (UEs) having co-located hotspots; and processing circuitry coupled to the memory and configured to determine configuration information for at least one co-located hotspot based on the information received from a respective UE, the configuration information including an identifier for a channel on which the at least one co-located hotspot is to operate, and a duration for which the configuration information is to remain valid; and provide configuration information to the at least one co-located hotspot.

In Example 31, the subject matter of Example 30 may optionally include wherein the information includes interference information for one or more channels on which the plurality of UEs are operating.

In Example 32, the subject matter of any of Examples 30-31 may optionally include wherein the information includes application information for one or more applications of the plurality of UEs.

In Example 33, the subject matter of any of Examples 30-32 may optionally include wherein the processing circuitry is configured to determine configuration information using a machine learning (ML) algorithm.

In Example 34, the subject matter of Example 33 may optionally include wherein the ML algorithm predicts location for the at least one UE of the plurality of UEs based on historical information for at least the at least one of the plurality of UEs.

What is claimed is:

1. An apparatus comprising:
memory to maintain a list of pairs of user equipments (UEs) and transmit points (TPs) within an area; and
processing circuitry coupled to the memory, the processing circuitry configured to:
designate an order for the list of pairs based upon a priority criterion, a first pair of the list of pairs having a highest priority based on the priority criterion;
provide a first message to a first TP corresponding to the first pair, the message including an instruction to adjust transmission power to a first optimized power level based on an optimization function; and
provide a second message to a second TP corresponding to a second pair of the list of pairs, the second pair having a lower priority than the first pair, the message including an instruction to adjust transmission power to a second optimized power level based on the optimization function and based on the first optimized power level.

2. The apparatus of claim 1,
wherein if the optimized power level is less than or equal to about 10% of full transmission power for a TP within the area, the processing circuitry is configured to instruct the respective TP to turn off.

3. The apparatus of claim 1,
wherein the processing circuitry is configured to provide messages to TPs sequentially according to priority of a respective pair of the list of pairs.

4. The apparatus of claim 1,
wherein the priority criterion includes a proportional fairness criterion.

5. The apparatus of claim 1,
wherein the optimization function includes a weighted sum rate function.

6. The apparatus of claim 5,
wherein at least one pair of the list of pairs operates in non-orthogonal multiple access (NOMA), and wherein the order for the list of pairs is based on a weighted NOMA sum rate.

7. The apparatus of claim 5,
wherein the optimization function is further based on actual channel gain between a TP of a pair of the list of pairs and a respective UE of the pair.

8. The apparatus of claim 1,
further comprising transceiver circuitry and wherein the processing circuitry is coupled to the transceiver circuitry and configured to provide the first and second messages over a control channel using the transceiver circuitry.

9. A method comprising:
maintaining a list of pairs of user equipments (UEs) and transmit points (TPs) within an area;
designating an order for the list of pairs based upon a priority criterion, a first pair of the list of pairs having a highest priority based on the priority criterion;
providing a message to a first TP corresponding to the first pair, the message including an instruction to adjust transmission power to a first optimized power level based on an optimization function; and
providing a message to a second TP corresponding to a second pair of the list of pairs, the second pair having a lower priority than the first pair, the message including an instruction to adjust transmission power to a second optimized power level based on the optimization function and based on the first optimized power level.

10. The method of claim 9,
wherein if the optimized power level is less than or equal to about 10% of full transmission power for a TP within the area, the method further comprises instructing the respective TP to turn off.

11. The method of claim 9,
further comprising providing messages to TPs sequentially according to priority of a respective pair of the list of pairs.

12. The method of claim 9,
wherein the optimization function includes a weighted sum rate function.

13. The method of claim 12,
wherein at least one pair of the list of pairs operates in nonorthogonal multiple access (NOMA), and wherein the order for the list of pairs is based on a weighted NOMA sum rate wherein the optimization function is further based on actual channel gain between a TP of a pair of the list of pairs and a respective UE of the pair.

14. The method of claim 12,
further comprising providing the first and second messages over a control channel.

15. The method of claim 9,
wherein the priority criterion includes a proportional fairness criterion.

16. A non-transitory computer-readable medium including instructions that, when executed on a processor, cause the processor to perform operations comprising:
maintaining a list of pairs of user equipments (UEs) and transmit points (TPs) within an area;
designating an order for the list of pairs based upon a priority criterion, a first pair of the list of pairs having a highest priority based on the priority criterion;
providing a message to a first TP corresponding to the first pair, the message including an instruction to adjust transmission power to a first optimized power level based on an optimization function; and
providing a message to a second TP corresponding to a second pair of the list of pairs, the second pair having a lower priority than the first pair, the message including an instruction to adjust transmission power to a second optimized power level based on the optimization function and based on the first optimized power level.

17. The non-transitory computer-readable medium of claim 16,
wherein if the optimized power level is less than or equal to about 10% of full transmission power for a TP within the area, the instructions, when executed on the processor, further cause the processor to perform instructing the respective TP to turn off.

18. The non-transitory computer-readable medium of claim 16,
wherein the instructions, when executed on the process, further cause the processor to perform providing messages to TPs sequentially according to priority of a respective pair of the list of pairs.

19. The non-transitory computer-readable medium of claim 16,
wherein the priority criterion includes a proportional fairness criterion.

20. The non-transitory computer-readable medium of claim 16,
wherein the instructions, when executed on the process, further cause the processor to perform providing the first and second messages over a control channel.

21. The non-transitory computer-readable medium of claim 16,
wherein the optimization function includes a weighted sum rate function.

22. The non-transitory computer-readable medium of claim 21,
wherein at least one pair of the list of pairs operates in non-orthogonal multiple access (NOMA).

23. The non-transitory computer-readable medium of claim 22,
wherein the order for the list of pairs is based on a weighted NOMA sum rate.

24. The non-transitory computer-readable medium of claim 16,
wherein the optimization function is further based on actual channel gain between a TP of a pair of the list of pairs and a respective UE of the pair.

* * * * *